(12) United States Patent
Marshall et al.

(10) Patent No.: US 11,781,850 B1
(45) Date of Patent: Oct. 10, 2023

(54) INSTALLATION TOOL FOR AFFIXING OBJECTS TO A PLURALITY OF VERTICAL SURFACES AND METHODS USING THEREOF

(71) Applicants: Christopher Jason Roy Marshall, Beaumont (CA); Adam Willis Groshong, Sherwood Park (CA)

(72) Inventors: Christopher Jason Roy Marshall, Beaumont (CA); Adam Willis Groshong, Sherwood Park (CA)

( * ) Notice: Subject to any disclaimer, the term of this patent is extended or adjusted under 35 U.S.C. 154(b) by 8 days.

(21) Appl. No.: 17/749,249

(22) Filed: May 20, 2022

(51) Int. Cl.
*G01B 5/14* (2006.01)
*G01B 5/00* (2006.01)

(52) U.S. Cl.
CPC ............ *G01B 5/14* (2013.01); *G01B 5/0007* (2013.01)

(58) Field of Classification Search
CPC ........ G01B 5/14; G01B 5/0007; A47G 1/205; E04G 21/1841
USPC ........ 33/1 CC, 1 G, 451, 528, 613, DIG. 10, 33/520, 644
See application file for complete search history.

(56) References Cited

U.S. PATENT DOCUMENTS

| | | | | |
|---|---|---|---|---|
| 2,842,860 | A * | 7/1958 | Gray | B25H 7/02 101/112 |
| 2,919,913 | A * | 1/1960 | Phair | H02G 3/125 33/406 |
| 3,371,423 | A * | 3/1968 | Paul | B25H 7/00 33/666 |
| 3,522,658 | A * | 8/1970 | Howell | B25H 7/00 33/528 |
| 3,842,510 | A * | 10/1974 | Elliott | G01B 3/1084 33/528 |
| 4,059,907 | A * | 11/1977 | Dauber | G01B 5/14 33/528 |
| 4,285,135 | A * | 8/1981 | Minozzi, Jr. | B23Q 9/00 33/528 |
| 4,423,555 | A * | 1/1984 | Wootten | E04F 21/0076 33/528 |

(Continued)

FOREIGN PATENT DOCUMENTS

| | | | | |
|---|---|---|---|---|
| CA | 2125518 A1 | 12/1995 | | |
| CH | 701839 B1 * | 3/2011 | | A47G 1/205 |

(Continued)

*Primary Examiner* — Christopher W Fulton
(74) *Attorney, Agent, or Firm* — Argus Intellectual Enterprise; Jordan Sworen; Daniel Enea

(57) ABSTRACT

Described are various embodiments of an installation tool for affixing objects to plurality of vertical surfaces and methods using thereof. In one embodiment, a tool illustratively comprises a rigid and elongated rectangular body, said body extending longitudinally according to a first axis, the body comprising a front flat surface and a rear flat surface comprising thereon corresponding measurement scale for acquiring, at least in part, said plurality of reference installation measurements; a bubble level; and two elongated arms, each arm being reversibly extendable from one of two end flat surfaces along the first axis; two end-stops, each end-stop configured to be slidingly movable along a top channel of the body and comprising a securing means thereon to releasably secure the end-stop at a position along said top channel; and a support mount configured to have fastened thereto an extendable vertical support member.

20 Claims, 16 Drawing Sheets

(56) References Cited

U.S. PATENT DOCUMENTS

| | | | | |
|---|---|---|---|---|
| 4,610,092 | A * | 9/1986 | Hafele | B23B 47/287 33/613 |
| 4,614,043 | A * | 9/1986 | Nagano | G01B 5/20 33/529 |
| 4,648,185 | A * | 3/1987 | Brandimarte | A47G 1/205 33/669 |
| 4,696,113 | A * | 9/1987 | Rice | B25H 7/02 33/562 |
| 5,092,057 | A * | 3/1992 | Hoenig, Sr. | B25H 7/00 33/669 |
| 5,111,593 | A * | 5/1992 | Gehen, Sr. | H02G 1/00 33/DIG. 10 |
| 5,131,164 | A * | 7/1992 | Miller | E04F 21/0076 33/613 |
| 5,179,787 | A * | 1/1993 | Ostrowski | A47H 1/10 33/528 |
| 5,442,864 | A * | 8/1995 | Erman | G01C 9/26 33/376 |
| 5,692,357 | A * | 12/1997 | McCain | E04F 21/0076 33/528 |
| 6,293,023 | B1 | 9/2001 | Schooley | |
| 6,421,928 | B1 * | 7/2002 | Miller | A47G 1/205 33/669 |
| 6,442,853 | B1 | 9/2002 | Hale et al. | |
| 6,463,666 | B1 | 10/2002 | Szumer | |
| 6,473,983 | B1 * | 11/2002 | Gier | A47G 1/205 33/613 |
| 6,473,984 | B1 * | 11/2002 | Splain | G01B 5/004 33/760 |
| 6,785,977 | B1 * | 9/2004 | Crichton | G01C 9/00 33/613 |
| 7,290,346 | B2 | 11/2007 | Szumer et al. | |
| 8,286,363 | B1 * | 10/2012 | Martinez | G01C 9/26 33/645 |
| 8,347,518 | B1 * | 1/2013 | Martinez | A47G 1/205 33/645 |
| 9,032,637 | B2 * | 5/2015 | Propp | B25H 7/04 33/669 |
| 2007/0234584 | A1 * | 10/2007 | Robins | G01C 9/28 33/613 |
| 2020/0408498 | A1 | 12/2020 | Medina et al. | |

FOREIGN PATENT DOCUMENTS

| | | |
|---|---|---|
| CN | 207335701 U | 5/2018 |
| DE | 19903774 C1 | 5/2000 |
| EP | 0401815 A1 | 12/1990 |

* cited by examiner

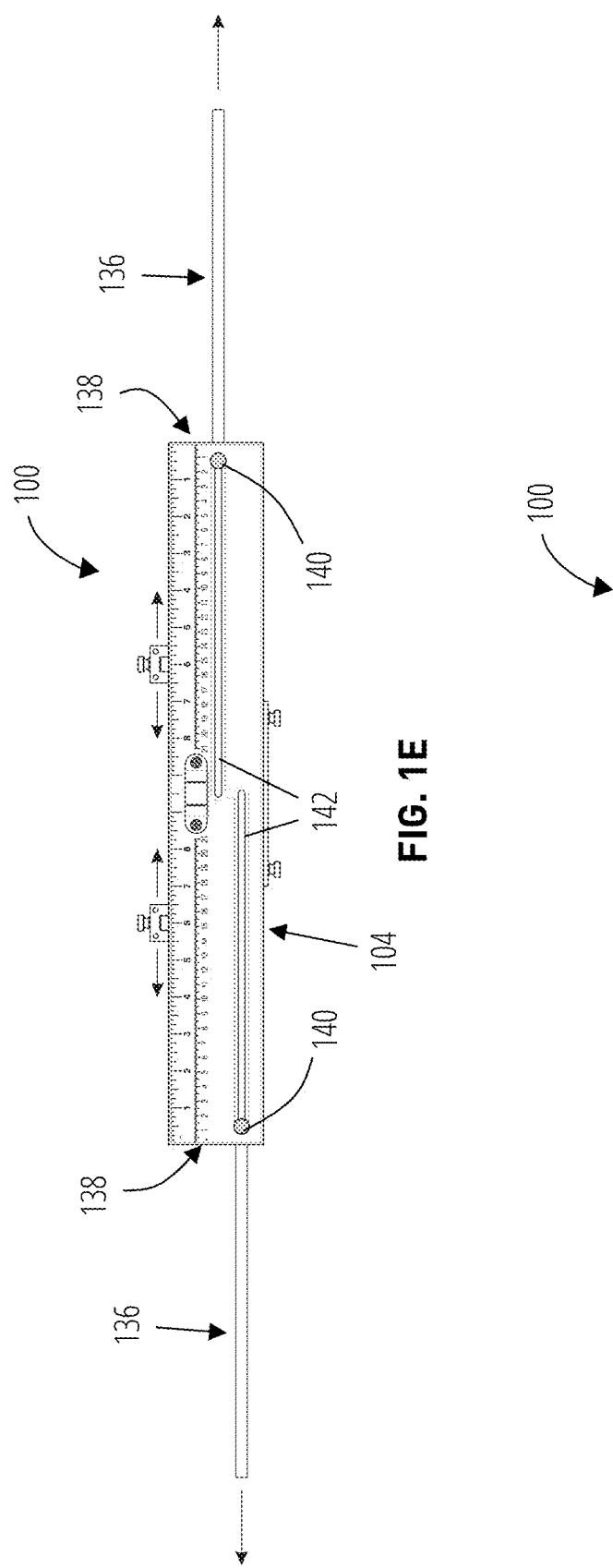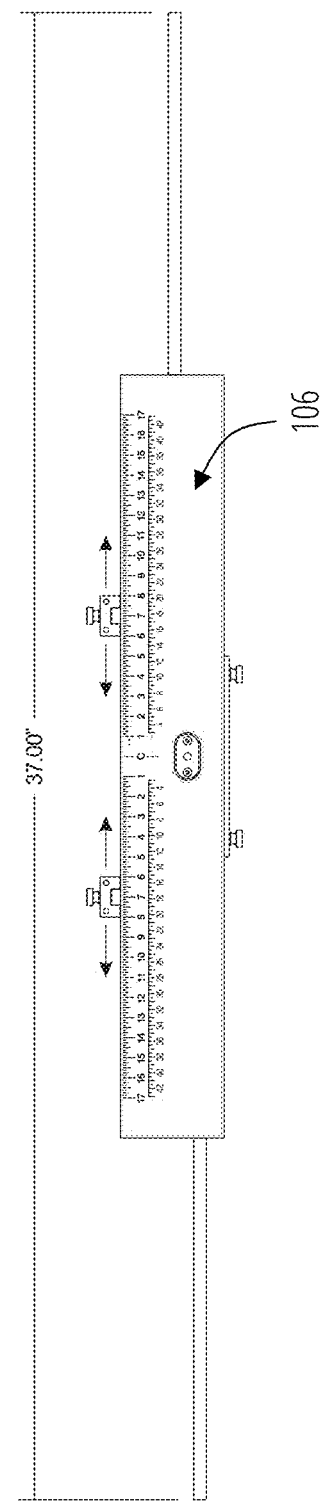
FIG. 1E
FIG. 1F

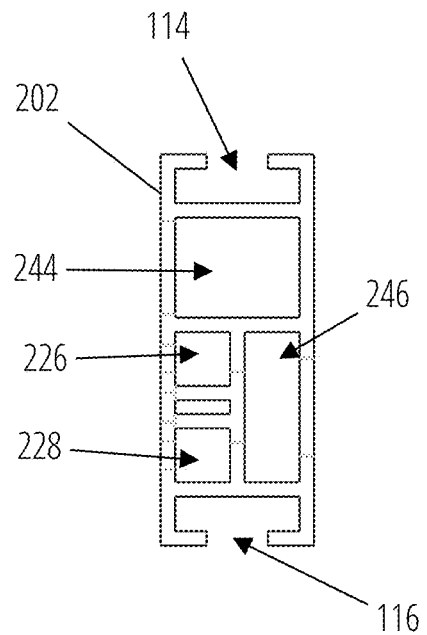
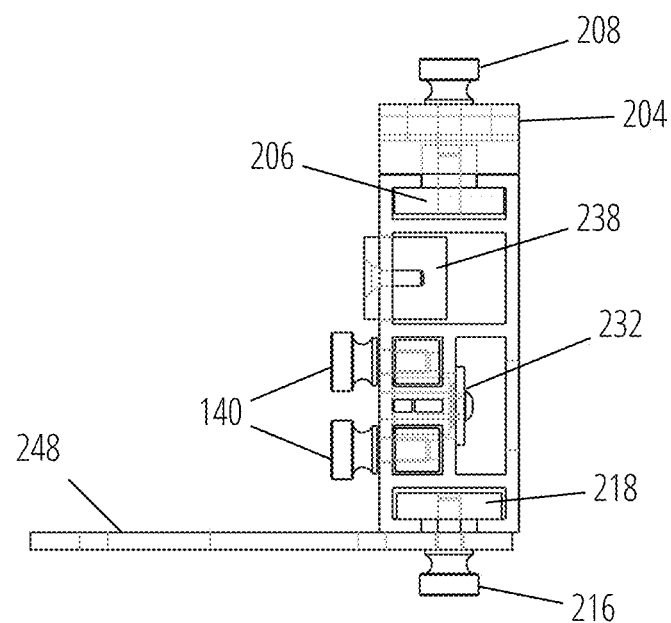
FIG. 2B  FIG. 2C
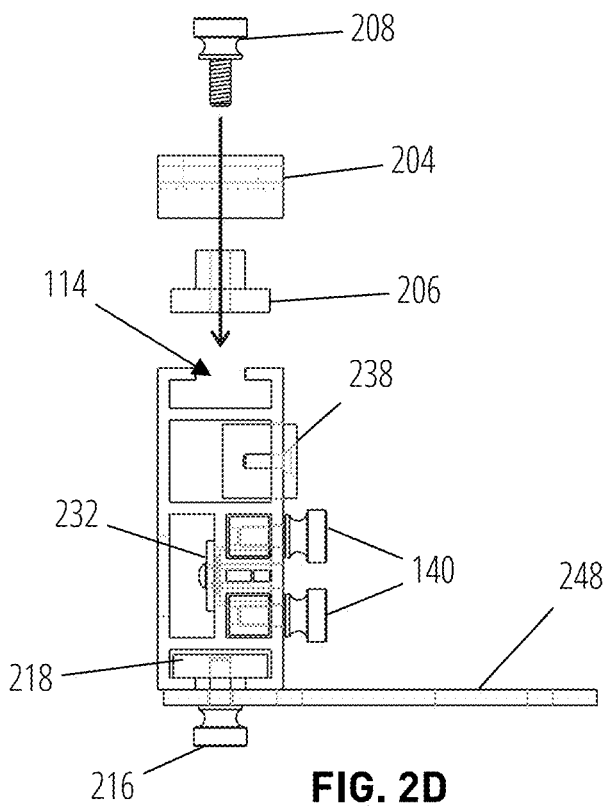
FIG. 2D

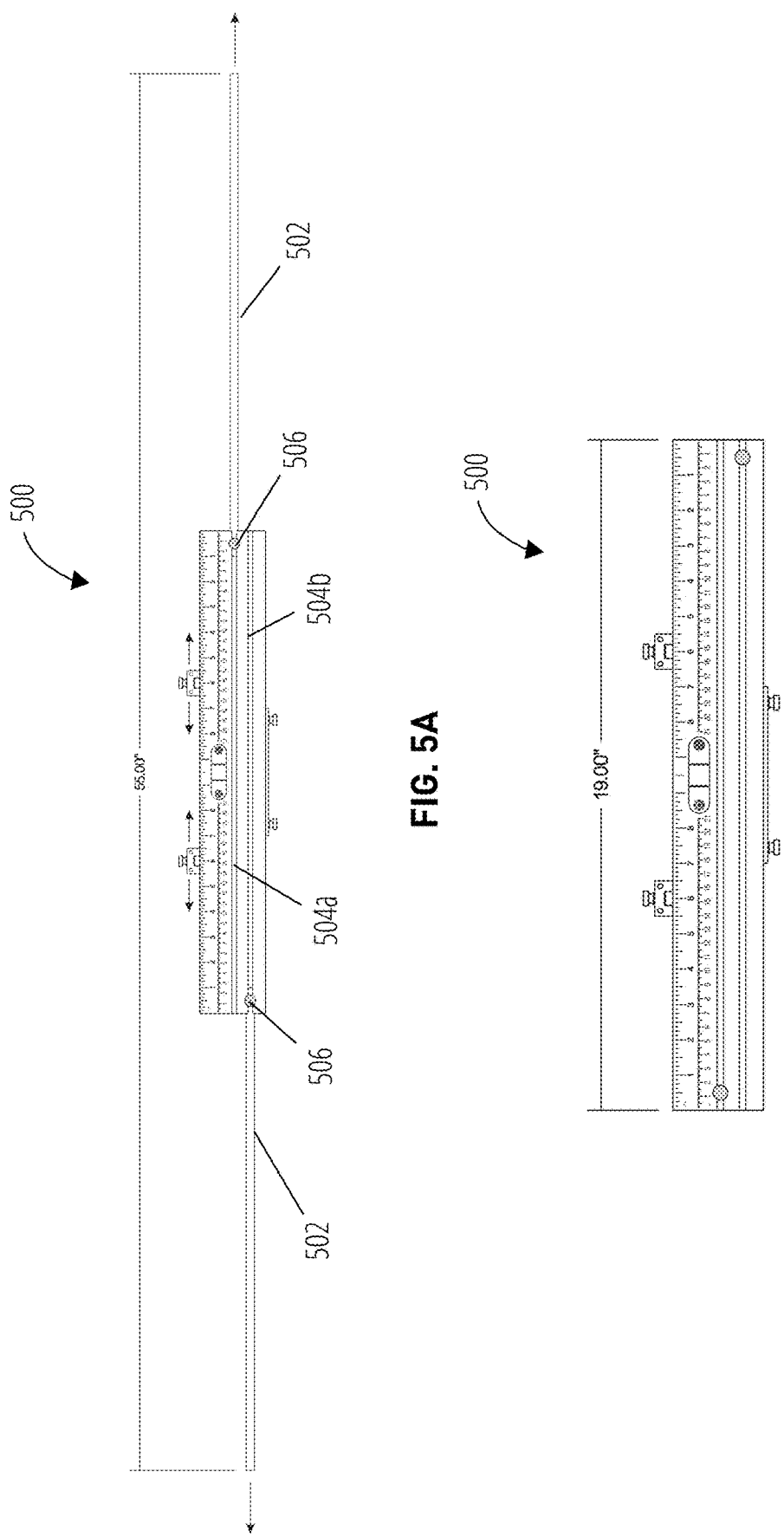

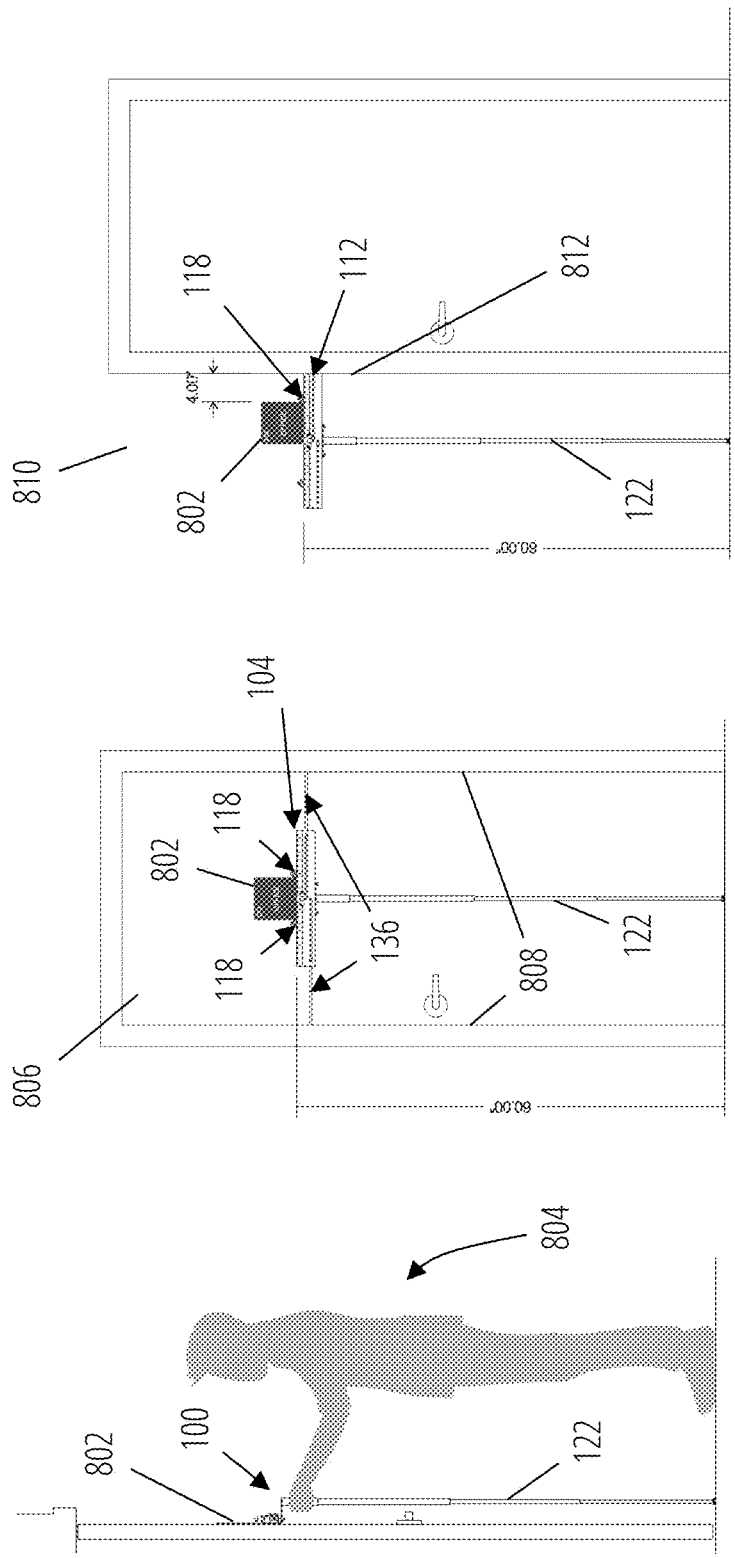

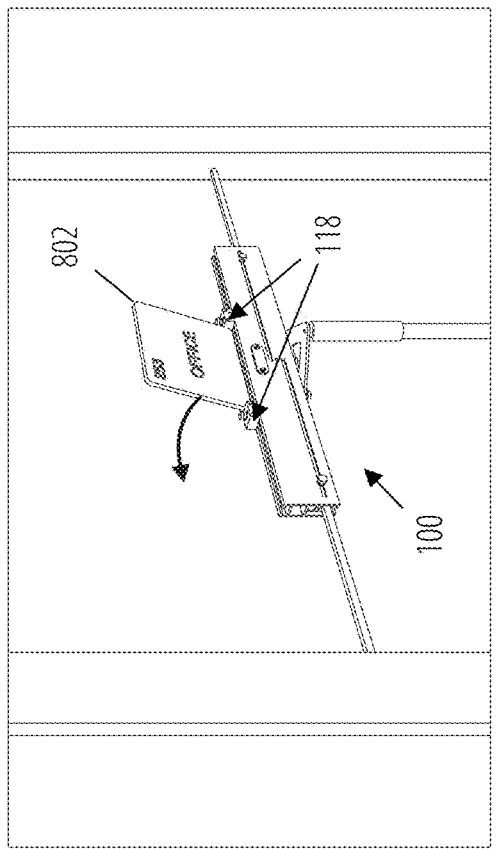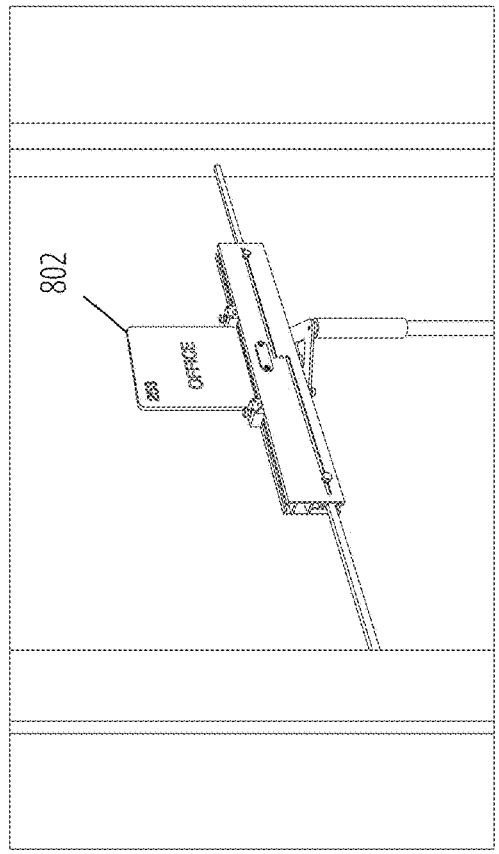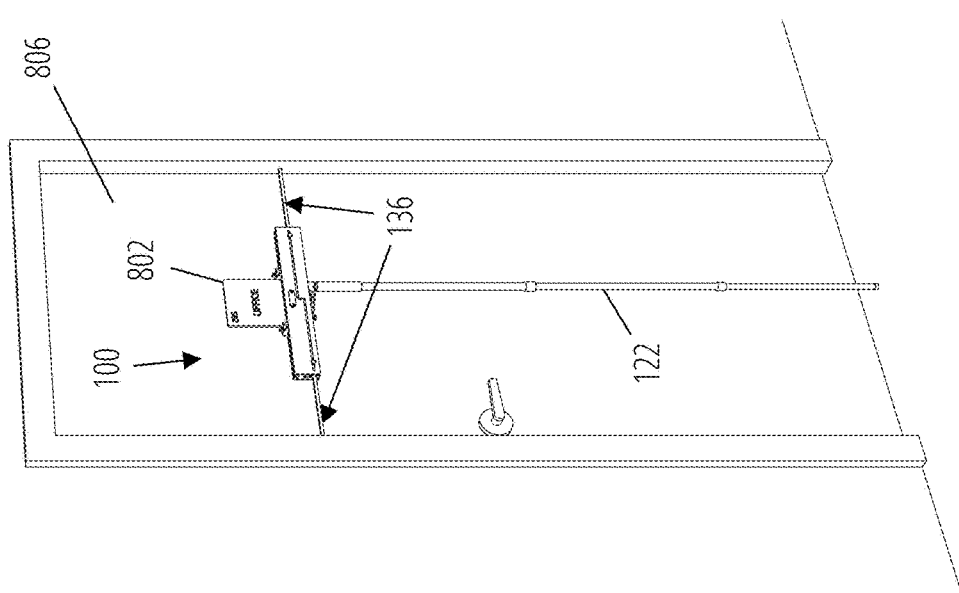

INSTALLATION TOOL FOR AFFIXING OBJECTS TO A PLURALITY OF VERTICAL SURFACES AND METHODS USING THEREOF

FIELD OF INVENTION

The present disclosure relates to measuring tools, and more particularly, to an installation tool for affixing objects to a plurality of vertical surfaces and methods using thereof and methods using thereof.

BACKGROUND

Large commercial construction projects, office buildings, apartment style condominiums, and hotels often have hundreds of objects that need to be installed on a vertical surface in a consistent fashion. This includes signs, such as door or wall signs, but also fire extinguisher brackets, hand sanitization and soap dispensers, artwork, mailboxes, security cameras or others. However, installing these objects consistently and efficiently on multiple surfaces, such as doors, windows or walls can be a tedious and time-consuming task. It typically requires the worker to take new measurements at each installation site and to use multiple tools to correctly mark or identify the precise location where the object is to be installed. In addition, some objects can have unconventional shapes. The related art describes many devices which can be used to measure and install objects such as signs on vertical surfaces or the like.

U.S. Pat. No. 6,293,023 B1 (Schooley) discloses a level comprises a frame defining first and second parallel channels and first and second rails fitted slidingly in the first and second channels respectively. The level is adjustable in length by sliding the rails in the respective channels of the frame. Shortcomings include a lack of integrated top and bottom channels allowing for end-stops and other accessories to be slidingly engaged therewith, a lack of slide out arms that self-center the tool within a standard door frame, a lack of a height supporting member configured to ensure a consistent vertical elevation of the tool between installation sites, and ruled measurement scales on the front and back surfaces allowing for adjusting of the end-stops without the requirement for a tape measure.

U.S. Pat. No. 4,648,185 (Brandimarte) discloses a leveling tool for accurately marking a pair of points on a horizontal or vertical line, for example for use in hanging pictures or shelves. The tool has an elongate bar provided with a fixed tab member, a longitudinally movable second tab member and bubble gauges set parallel with and at right angles to the length of the bar. The fixed tab member is used as a pivot placed on one of the points, and the tool is swung around the pivot until one or other of the bubble gauges is level. The second tab member is then used to mark the second point. Shortcomings include a lack of integrated top and bottom channels allowing for end-stops and other accessories to be slidingly engaged therewith, a lack of slide out arms that self-center the tool within a standard door frame, and a lack of a height supporting member configured to ensure a consistent vertical elevation of the tool between installation sites.

U. S. Pub. No. 2020/0408498 A1 (Medina) discloses a device that includes a ruler, a leveling device attached to the ruler and a plurality of pins. The device only requires one person to hang level pictures, paintings, frames and other wall hanging objects. The ruler is a made from a rigid material and has a plurality of holes therein where the pins are inserted. The ruler has a fixed length or has a telescopic structure. The plurality of holes formed in the ruler are spaced apart from one another and the spacing is uniform or variable spacing. The leveling device is a bubble leveler including three bubble levels where one bubble level is horizontally positioned, another bubble level is vertically positioned, and the third bubble level has an angle relative to the horizontally positioned bubble level. The plurality of pins include a threaded pointed screw with a knob attached to one end of the screw. Shortcomings include a lack of integrated top and bottom channels allowing for end-stops and other accessories to be slidingly engaged therewith, a lack of slide out arms that self-center the tool within a standard door frame, and a lack of a height supporting member configured to ensure a consistent vertical elevation of the tool between installation sites.

DE Pub. No. 19903774 C1 (Schiewer) discloses a light metal tile level having horizontal and vertical arms with the horizontal arm having a spirit level type indicator. Both arms have scale divisions on both sides for the positioning of horizontal and vertical jointed sliders on the arms. Once the sliders are positioned, they are fixed in place using locking screws. Shortcomings include a lack of integrated top and bottom channels allowing for end-stops and other accessories to be slidingly engaged therewith, a lack of slide out arms that self-center the tool within a standard door frame, and a lack of a height supporting member configured to ensure a consistent vertical elevation of the tool between installation sites.

CA Pub. No. 2,125,518 A1 (Reble) discloses a device for temporarily hanging and positioning pictures and the like, including at least one upright member supported between the floor and the ceiling, a horizontal member attachable to the vertical member at various positions therealong, a series of picture hanger supports located at intervals along the horizontal member, diagonal bracket means extending between the upright and horizontal members, and longitudinal adjusting means on the upright elements, leveling means associated with the horizontal member. Shortcomings include a lack of integrated top and bottom channels allowing for end-stops and other accessories to be slidingly engaged therewith, a lack of slide out arms that self-center the tool within a standard door frame, and ruled measurement scales on the front and back surfaces allowing for adjusting of the end-stops without the requirement for a tape measure.

EP Pat. No. 0 401 815 B1 (Otto) discloses a measuring instrument (spirit level) with which the horizontal or the vertically inclined position of a flat surface is checked. For this purpose, a bar of relatively great length is provided. This is necessary in order to record the area to be tested on a sufficiently large surface if the beam with its contact surface is to be placed on a surface that is to be weighed out horizontally or if a vertically rising contact surface is to be balanced vertically. Shortcomings include a lack of integrated top and bottom channels allowing for end-stops and other accessories to be slidingly engaged therewith, a lack of a height supporting member configured to ensure a consistent vertical elevation of the tool between installation sites, and ruled measurement scales on the front and back surfaces allowing for adjusting of the end-stops without the requirement for a tape measure.

U.S. Pat. No. 5,092,057 A (Hoenig) discloses a tool for locating a pair of points on a horizontal line at a desired distance from a reference point which includes an elongated body carrying a pair of slidable selectively positonable spaced apart locator members and a scale for indicating the spacing between the indicator members and a bubble gauge for indicating a horizontal position of the indicator members. A tape measure is mounted for extension perpendicular from the body member for measuring the distance from the indicator members to the reference point at the free end of the extended tape measure. Shortcomings include a lack of integrated top and bottom channels allowing for end-stops and other accessories to be slidingly engaged therewith, a lack of slide out arms that self-center the tool within a standard door frame, and a lack of a height supporting member configured to ensure a consistent vertical elevation of the tool between installation sites.

U.S. Pat. No. 6,463,666 B1 (Szumer) discloses a measuring and leveling device constructed with bubble vials for leveling which are movable to the precise point of application, with the measuring scale situated on a surface so constructed as to allow the scale to be located directly against and parallel to the surface to be measured. The device serves for both measuring and leveling tasks in one tool, and is constructed including a body portion provided with a ruler for measuring distances between points, in which the measuring scale is marked on a surface which tapers to a flat edge as in a conventional ruler. The body portion has two parallel tracks along its longitudinal axis, and two clamps situated on the body of the leveling device, each of which is held in place by tabs situated on the underside of the clamps and insertable into the parallel tracks, each clamp including a bubble vial mounting portion into which a bubble vial is fixedly mounted. Shortcomings include a lack of slide out arms that self-center the tool within a standard door frame, and a lack of a height supporting member configured to ensure a consistent vertical elevation of the tool between installation sites.

CN Pat. No. 2,073,35701 U (Huang et al.) discloses a kind of scalable level meter, some spirit levers including flat base and on flat base, flat base at least two, and be slidably connected relatively between adjacent plane base, the opposite side of adjacent plane base is separately installed with magnet. Slide and guide rail are respectively equipped with adjacent two pieces of flat bases, slide and guide rail are set along flat base length direction respectively, and slide is slidably mounted in guide rail. The fixing piece for being used for fixing the relative position between adjacent flat base is equipped with the outside of guide rail. Fixing piece includes the cylindrical piece being arranged on flat base, and the location hole coordinated with cylindrical piece is uniformly provided with slide. Shortcomings include a lack of integrated top and bottom channels allowing for end-stops and other accessories to be slidingly engaged therewith, a lack of a height supporting member configured to ensure a consistent vertical elevation of the tool between installation sites, and ruled measurement scales on the front and back surfaces allowing for adjusting of the end-stops without the requirement for a tape measure.

U.S. Pat. No. 7,290,346 B2 (Szumer et al.) discloses an extension set for a spirit level having an elongated leveling face for setting on a surface and defining a nominal working length, an opposite face to the leveling face, a pair of opposite major side surfaces, and a pair of opposite end sections, the extension set including a pair of discrete elongated U-shaped profile spirit level extenders for lengthwise accommodating an end section of the spirit level with its leveling face facing towards the surface and its opposite face facing away therefrom on spaced apart alignment on the surface such that the pair of spirit level extenders partially underlie the spirit level's leveling face and their remaining portions extend lengthwise therebeyond for extending its nominal working length, and a pair of spirit level clamps for mounting on the pair of spirit level extenders for clamping the spirit level thereon. Shortcomings include a lack of integrated top and bottom channels allowing for end-stops and other accessories to be slidingly engaged therewith, a lack of a height supporting member configured to ensure a consistent vertical elevation of the tool between installation sites, and ruled measurement scales on the front and back surfaces allowing for adjusting of the end-stops without the requirement for a tape measure.

U.S. Pat. No. 6,442,853 B1 (Hale et al.) discloses a door jamb square made of two extensions, a vertical extension and a horizontal extension. Both extensions are provided with bubble spirit levels and are attached forming a right angle, that can be fit into the corner of a door jamb to square that doorjamb. The door jamb square is secured to the door jamb using a nailing plate, web plate and a bolt. The web plate is placed within the webbing of the door jamb square, covered by the nailing plate. The web plate and nailing plate each have an aperture aligned and fitted with the bolt. Additional sheetrock screws are used to secure the other side of the nailing plate and door jamb assembly to the door jamb. Shortcomings include a lack of integrated top and bottom channels allowing for end-stops and other accessories to be slidingly engaged therewith, a lack of slide out arms that self-center the tool within a standard door frame, a lack of a height supporting member configured to ensure a consistent vertical elevation of the tool between installation sites, and ruled measurement scales on the front and back surfaces allowing for adjusting of the end-stops without the requirement for a tape measure.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concepts described herein to provide a basic understanding of some aspects of the disclosure. This summary is not an extensive overview of the disclosure. It is not intended to restrict key or critical elements of embodiments of the disclosure to delineate their scope beyond that which is explicitly or implicitly described by the following description and claims.

A need exists for installation tools and methods using thereof that overcomes some of the drawbacks of known techniques, or at least, provides a useful alternative thereto. Some aspects of the herein described embodiments provide examples of such devices. In particular, one such aspect provides an installation tool for affixing objects to a plurality of vertical surfaces that, in accordance with different embodiments, comprises useful features such as, for example, an integrated top and bottom channel that allows for end-stops and other accessories to be slidingly engaged therewith, slide out arms that self-center the tool within a standard door frame or window, a height supporting member configured to ensure a consistent vertical elevation of the tool between installation sites, and ruled measurement scales on the front and back surfaces allowing for adjusting of the end-stops without the requirement for a tape measure.

In accordance with one aspect, there is provided a tool for acquiring a plurality of reference installation measurements and for consistently affixing a plurality of similarly-shaped objects on a vertical surface at a corresponding plurality of installation sites in accordance with said reference installation measurements, the tool comprising: a rigid and elongated rectangular body, said body extending longitudinally according to a first axis, the body comprising: a top flat surface and a bottom flat surface, the top flat surface and bottom flat surface parallel to each other and each comprising integrated therein a top channel and a bottom channel, respectively, the top and bottom channels extending along the first axis; a front flat surface and a rear flat surface, the front flat surface and the rear flat surface parallel to each other and each perpendicular to the top flat and bottom flat surfaces; each of the front flat surface and the rear flat surface comprising thereon corresponding measurement scale for acquiring, at least in part, said plurality of reference installation measurements; and two end flat surfaces, each end flat surface perpendicular to the top flat surface, bottom flat surface, front flat surface and rear flat surface, and each comprising therein a top aperture for accessing the top channel and a bottom aperture for accessing the bottom channel; a bubble level in said front flat surface; and two elongated arms, each arm being reversibly extendable from one of the two end flat surfaces along the first axis; two end-stops, each end-stop configured to be slidingly movable along the top channel and comprising a securing means thereon to releasably secure the end-stop at a position along said top channel; and a support mount slidingly movable along the bottom channel and configured to have fastened thereto an extendable vertical support member, the support member configured to support the tool at a reference elevation, the reference elevation being part of the plurality of reference installation measurements.

In one embodiment, the plurality of objects is selected from the group consisting of: signs, boards, panels, frames, hooks, mounts, brackets, fire extinguisher enclosures, hand sanitation stations, soap dispensers, artwork, whiteboards, bulletin boards, and security cameras.

In one embodiment, the vertical surface includes a wall, a window or a door.

In one embodiment, each of the two end-stops is further slidingly movable horizontally along an orientation perpendicular to said first axis.

In one embodiment, the tool further comprises one or more accessories, each accessory configured to be removably slidingly engageable with the top channel via the top aperture or the bottom channel via the bottom aperture and operable to be slidingly moved along either top or bottom channel and secured at a location thereon.

In one embodiment, the tool further comprises a jig; and wherein each of the end-stops comprises one or more fastening holes for therein for fastening said jig thereto.

In one embodiment, the jig comprises one or more holes therein for drilling one or more corresponding mounting holes.

In one embodiment, the jig comprises a cut-out shaped to receive each of the plurality of signs.

In one embodiment, said support member is a telescopic monopod.

In one embodiment, the measurement scale of the front flat surface is configured to measure a distance relative the closest of the end surfaces.

In one embodiment, the measuring scale of the rear flat surface is configured to measure a distance from a center position of the elongated body along the first axis.

In one embodiment, at least one of the two elongated arms comprises a securing means operable to be used to manually extend or retract the arm and configured to releasably securing at a designated extension length.

In one embodiment, the two elongated arms are coupled to one another, so that extending one arm via the securing means in one direction automatically extends the other arm in the opposite direction by a same amount.

In one embodiment, each of the two elongated arms comprise a gear rack, and wherein the two gear racks are mechanically coupled via a gear engaging each gear rack from opposite sides thereof.

In one embodiment, the one or more accessories comprise a carpenter's square.

In one embodiment, the one or more accessories comprises at least one laser distance finder or at least one laser angle finder.

In accordance with another aspect, there is provided a process for acquiring a set of installation measurements, for, using the tool of claim 1, the installation measurements comprising a designated elevation, designated horizontal position and designated end-stop positions, and for affixing a plurality of similarly-shaped objects on a vertical surface at a corresponding plurality of installation sites in accordance with said reference installation measurements, each object of said plurality of objects having an mounting surface thereof coated with adhesive, the method comprising the steps of: moving the tool to a first installation site of said plurality of installations sites; adjusting at least one of the two end-stops at said designated end-stop positions; locking each of the two end-stops at the designated end-stop positions; extending said support member at said designated elevation; locking the support member at the designated elevation; abutting the rear flat surface against the vertical surface; positionally adjusting the tool horizontally at said designated horizontal position; leveling the tool horizontally using the bubble level; abutting a bottom edge of a first object of said plurality of objects on said top flat surface in-between the inner edges of each end-stop, the mounting surface facing the vertical surface; pivoting the first object towards a vertical surface, so as to secure the first object to the vertical surface via the adhesive on the mounting surface.

In one embodiment, the process further comprises the steps of: moving the tool to a second installation site of said plurality of installation sites; abutting the rear flat surface of the tool against the vertical surface at said second installation site; positionally adjusting the tool horizontally based on said designated horizontal position; abutting a bottom edge of a second object of said plurality of objects on said top flat surface in-between the inner edges of each end-stop; pivoting the second object towards the vertical surface, so as to secure the second object to the vertical surface via the adhesive on the mounting surface.

In one embodiment, the vertical surface is a door, and said adjusting the end-stops positions include the steps of: moving the two end-stops equidistantly left and right of a center location of the tool along said first axis to the designated end-stop positions so that the distance between the inner edges of each end-stop is equal to a width of each of said plurality of objects; locking the end-stops; and wherein said positionally adjusting the tool horizontally includes the steps of: placing the tool within a door frame; equally extending the extendable arms in opposite directions so that they reach the inner surfaces of a door frame on both sides of the tool, thereby centering the tool with respect to the door frame; and locking the extendable arms.

In one embodiment, said vertical surface is a wall near a door frame, and wherein said adjusting the end-stops positions include the steps of: moving an end-stop of said two end-stops to a designated end-stop position corresponding to an offset distance between an inner edge of the end-stop and a closest of the two end flat surfaces; locking the end-stops; and wherein said positionally adjusting the tool horizontally includes the steps of: abutting said closest of the two end surfaces against an outer edge of the door frame.

Other aspects, features and/or advantages will become apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein:

FIG. 1E is a front view of the installation tool with the extendable arms fully extended, in accordance with one embodiment;

FIG. 1F is a rear view thereof, in accordance with one embodiment;

FIG. 2B is a cross-sectional view of an extruded body thereof, in accordance with one embodiment;

FIG. 2C is a cross-sectional view thereof comprising additional parts integrated therein, in accordance with one embodiment;

FIG. 2D is a cross-sectional view thereof illustrating how to assemble an end-stop in a top channel of the extruded body, in accordance with one embodiment;

FIGS. 5A and 5B are a front and rear view, respectively, of an installation tool having non-coupled extending arms, in accordance with one embodiment;

FIGS. 8A to 8C, and 9A to 9C are schematic diagrams illustrating a two different use cases of a user installing a rectangular sign with the installation tool of FIGS. 1A-1F, in accordance with one embodiment;

Figure 1A:
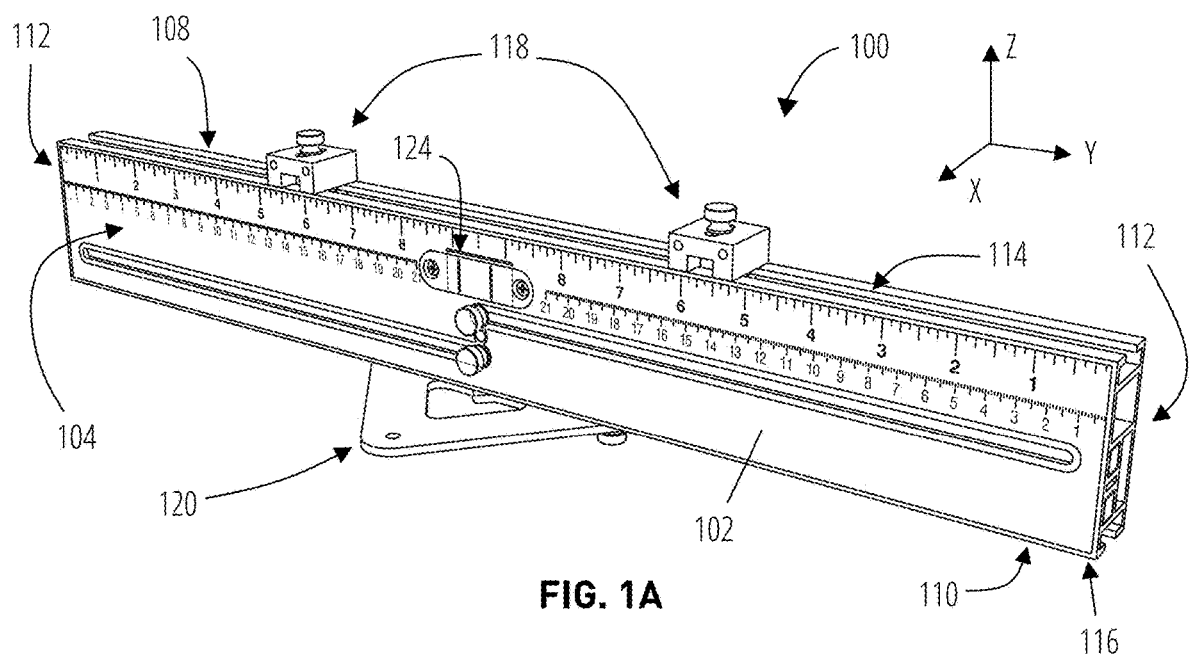
FIG. 1A is a front perspective view of an installation tool, in accordance with one embodiment.

Elements in the several drawings are illustrated for simplicity and clarity and have not necessarily been drawn to scale. For example, the dimensions of some of the elements. In the drawings some elements may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various tools and systems will be described below to provide examples of implementations of the system disclosed herein. No implementation described below limits any claimed implementation and any claimed implementations may cover processes or tools that differ from those described below. The claimed implementations are not limited to tools or processes having all of the features of any one tool or process described below or to features common to multiple or all of the tools or processes described below. It is possible that a tool or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

The tool and methods described herein provide, in accordance with different embodiments, different examples of an installation tool for efficiently and consistently affixing or installing a plurality of identically shaped objects (e.g., signs or other) at a corresponding plurality of similar installation sites. In one non-limiting example, the objects can be identically-shaped signs that need to be installed in an office or building in the exact same relative position (e.g., in the middle of a door, or on the side of the door at a given offset distance, etc.). Typically, this would require the person installing the signs to re-take the measurements at each installation site and install each sign accordingly. This is a slow and tedious process, and it may lead to measurement errors being made, leading to some of the signs not being installed exactly in the same way.

In contrast, the tool described below, in accordance with different embodiments, allows the user to take a set of reference measurements only once by locking movable adjustable end-stops or other accessories in a reference configuration that corresponds to the reference measurements. Thus, in the example above, the adjustable end-stops and other accessories can then be used to assist the person in installing the signs at multiple and similar installation sites, without having to re-take the measurements at each site. The adjustable end-stops have fastening holes to fasten jigs or templates thereto, which is useful for when the signs require holes to be drilled or are unconventionally shaped. Other accessories that can be used include, for example, a height support member for supporting the tool at a reference elevation, line lasers that may be adjustable for inclination, set squares, "T" bevel, clamps and more. Thus, the tool described herein, in accordance with different embodiments, advantageously allows signs or other similarly-shaped objects to be installed in a consistent and error-free fashion on vertical surfaces across all installation sites or locations and reduces the total amount of time required to do so. This provides a reduction to labor hours to install such projects allowing a company to either be more competitive in pricing or more profitable due to efficiencies on the job site.

While the disclosure above and below uses signs as an example of objects that are to be installed or affixed on the vertical surfaces, the skilled person in the art will understand that the tool described herein, in accordance with different embodiments, can equally be used to install, mount or affix any type similarly-shaped objects, such as signs, panels, boards, frames, mounts, hooks such as coat hooks, brackets, or devices that needs to be installed in a consistent fashion on a vertical surface at multiple installation sites. Other examples may include, without limitation, enclosures such as fire extinguisher brackets, hand sanitation stations, soap dispensers, artwork, whiteboards/bulletin boards, or any other board or panel, security cameras, mailboxes or others. Moreover, while the examples discussed herein focus on doors and walls near door frames as possible installation sites, the vertical surfaces mentioned herein can also include in some cases windows and walls near window frames, without limitation.

With reference to FIGS. 1A to 1H, an installation tool for efficiently and consistently affixing, mounting or installing a plurality of identically shaped objects (e.g., signs or other) on a vertical surface at a corresponding plurality of similar installation sites, referred using the numeral 100, will now be described. In this exemplary embodiment, the illustrated tool 100 has an elongated rectangular body 102. The body 102 typically comprises a front surface 104, a rear surface 106, a top portion 108, a bottom portion 110 and two end portion 112.

Figure 1B:
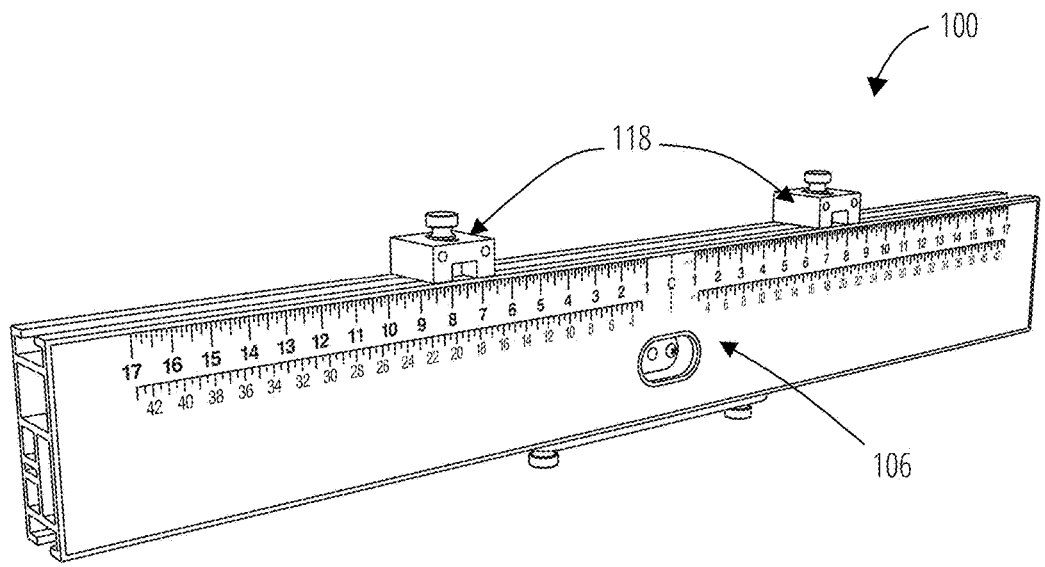
FIG. 1B is a rear perspective view thereof, in accordance with one embodiment.

FIGS. 1A and 1B are a front and a rear perspective view of the tool 100, respectively. The tool comprises a front surface 104 and a rear surface 106, each comprising a plurality of measuring scales thereon aligned along the length of the tool. The tool further comprises a flat top portion 108 and a flat bottom portion 110, which are shown to comprises integrated therein a top channel 114 and bottom channel 116, respectively. Each channel/track extends along the middle of the top portion 108 and bottom portion 110 along the length of the tool (e.g., from one end portion 112 to the other). In this example, these channels are used to slidingly engage a pair of adjustable end-stop 118 (in the top channel) and a support mount 120 (in the bottom channel). The adjustable end-stops 118 are each slidingly movable from left to right along the top channel 114 and can each be locked in place at a desired location along the channel corresponding to a reference measurement. Similarly, the support mount 120 can be moved along the bottom channel 116 and used to attach thereto a height supporting member 122 of the like (illustrated in FIG. 1H and FIGS. 8A to 11F, for example). Also shown in FIG. 1A is a bubble level 124 located in the front surface 104 which is used to level the tool 100.

Figure 1C:
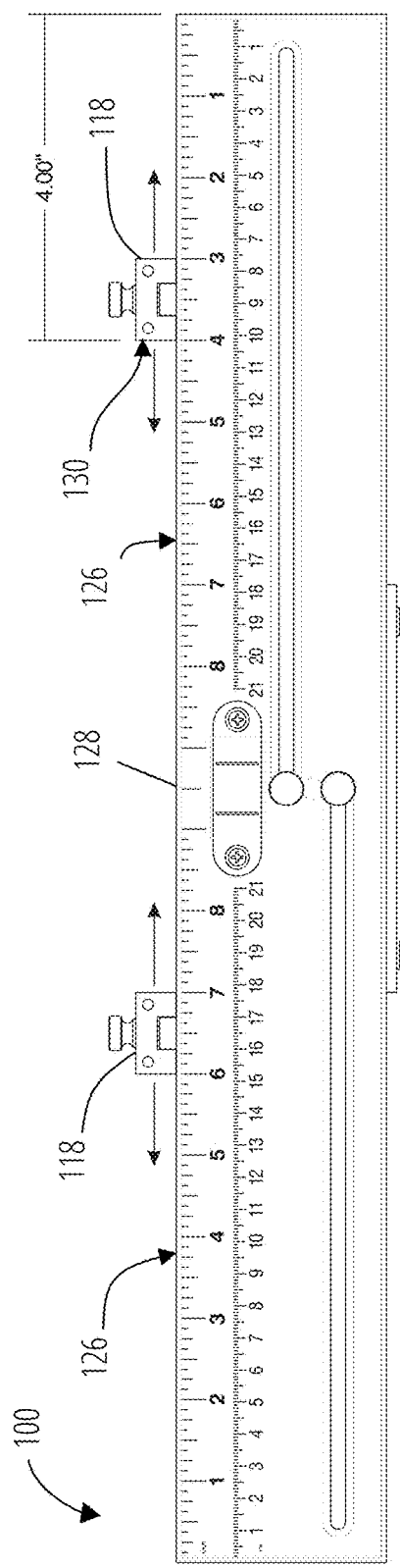
FIG. 1C is a front view thereof, in accordance with one embodiment.

FIG. 1C shows a front view of the tool 100. On the front side or surface 104, front measuring scales 126 are provided that indicate the distance from the nearest edge or end of the tool. A center point indicator 128 is also provided. This side may be useful, for example, for offsetting the object to be installed from a door frame, window frame or the edge of wall. The sliding adjustable end-stop 118 can be set and locked at a specific measurement location so that signs or objects can be quickly mounted at the same distance without repetitive measuring.

In the example of FIG. 1C, when the inside edge 130 of one of the sliding end-stops 118 is set to the 4" mark (here the end-stop shown on the right side of the tool 100 for example), that means that the inside edge 130 is exactly 4" from the closest end of the tool. An object to be installed (e.g., a sign or other) can now be placed on the tool and against the inside edge 130 of the end-stop to mount the object 4" from the edge of the door frame.

Figure 1D:
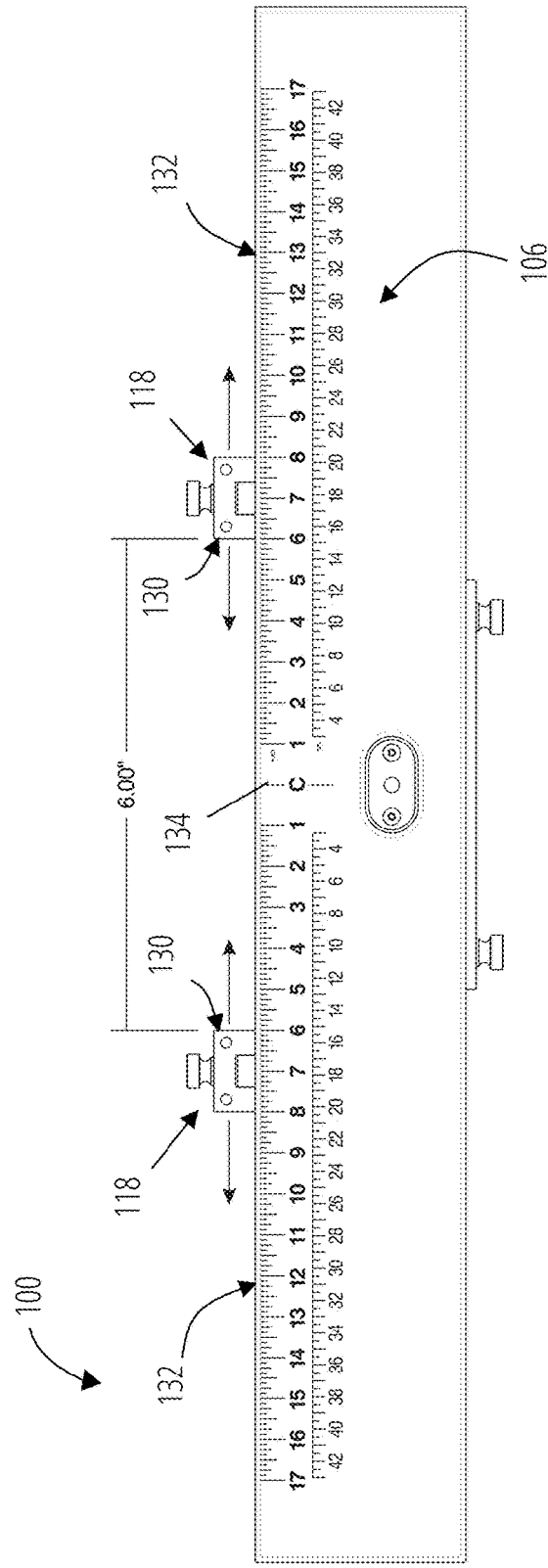
FIG. 1D is a rear view thereof, in accordance with one embodiment.

In contrast, the measurement scales 132 located on the back of the tool are used to measure how many equidistant inches or mm's there are between the sliding adjustable end-stop 118. This may be useful, for example, for centering an object to be installed on the tool at a center point 134 and using self centering extending arms 136 (to be discussed further below) to self-center the tool in a doorway (or within a window frame). This ensures that the sign placement will be in the center of the door it is being applied to. In the example of FIG. 1D, the inside edge 130 of both sliding adjustable end-stop 118 are each set to the 6" mark, meaning that there is a distance of exactly 6" between the inside edges 130 of the end-stops. This allows a 6" wide sign or other object to be placed on the tool between the end-stops to achieve a centrally mounted sign on the door.

As illustrated in FIGS. 1E and 1D, the tool 100 further comprises two extending arms 136 that are configured to reversibly extend away from the ends 138. In this embodiment, the arms 136 are mechanically coupled to one another such that extending one arm in one direction automatically moves the other arm in the opposite direction by a same amount. This allows the tool to be advantageously self-centering when extending either arm. For example, the tool can be placed inside a door frame and the arms can be extended until their ends abut on an opposite side of the frame, thus automatically centering the tool. Manually moving each arm 136 is achieved by moving a thumbscrew 140 attached thereto along a face channels or tracks 142 on the front surface 104. Each thumbscrew 140 can be reversibly screwingly secured along the face channel or track 142 to lock the arms at a desired extension length. In this embodiment, the right arm (when facing the front surface 104) is located higher than the one on the left as an example only, but the skilled person in the art will appreciate the opposite configuration can be used as well.

FIG. 1F shows a rear view of the tool 100 with the arms 136 fully extended.

Figure 1G:
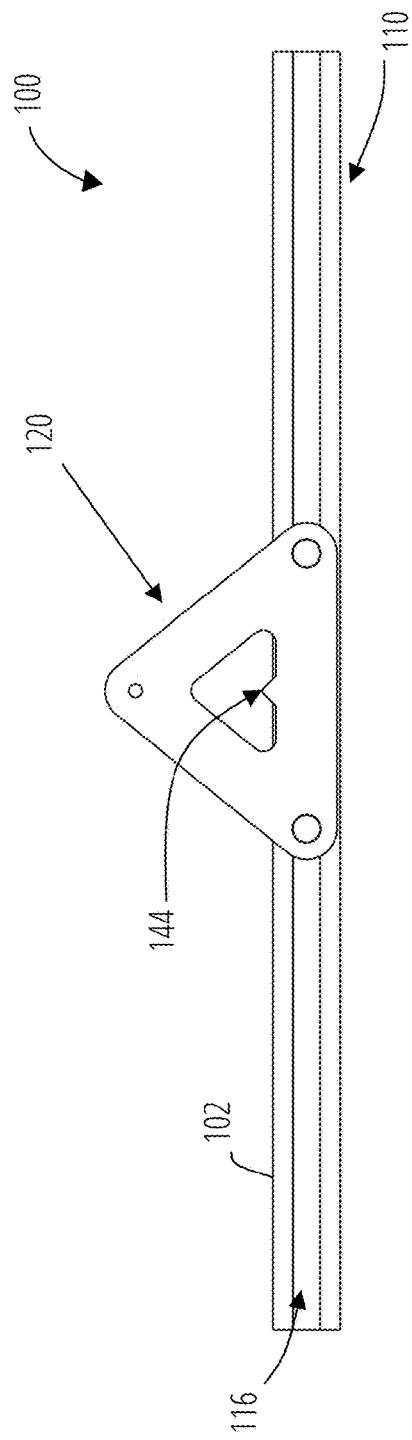
FIG. 1G is a bottom view of the installation tool, in accordance with one embodiment.

FIG. 1G shows a bottom view of the tool 100. It shows clearly the bottom portion 110 of the tool 100 having the support mount 120 being engaged in the bottom channel 116. The support mount 120 further comprises a mid-point indicator 144.

Figure 1H:
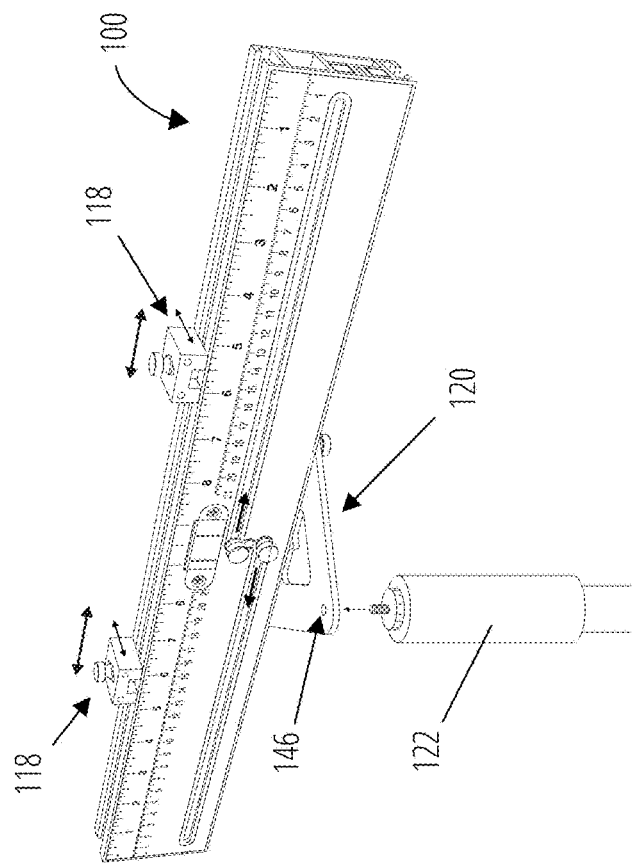
FIG. 1H is a front perspective view of the installation tool comprising a height supporting member, in accordance with one embodiment.

As shown in FIG. 1H, the height supporting member 122 may be attached or fastened to the support mount 120 via a hole 146. The height supporting member 122 is used to vertically support the tool 100 at a desired reference elevation. Thus, the length of the height supporting member 122 can be adjusted by the user and locked in that configuration to maintain the tool at a reference elevation. Once locked, the tool 100 can be moved to the different installation sites without worrying that the height or elevation of the object will change between installations. In some embodiments, the height supporting member 122 can take the form, for example, of a telescopic extendable pole or monopod.

Figure 2A:
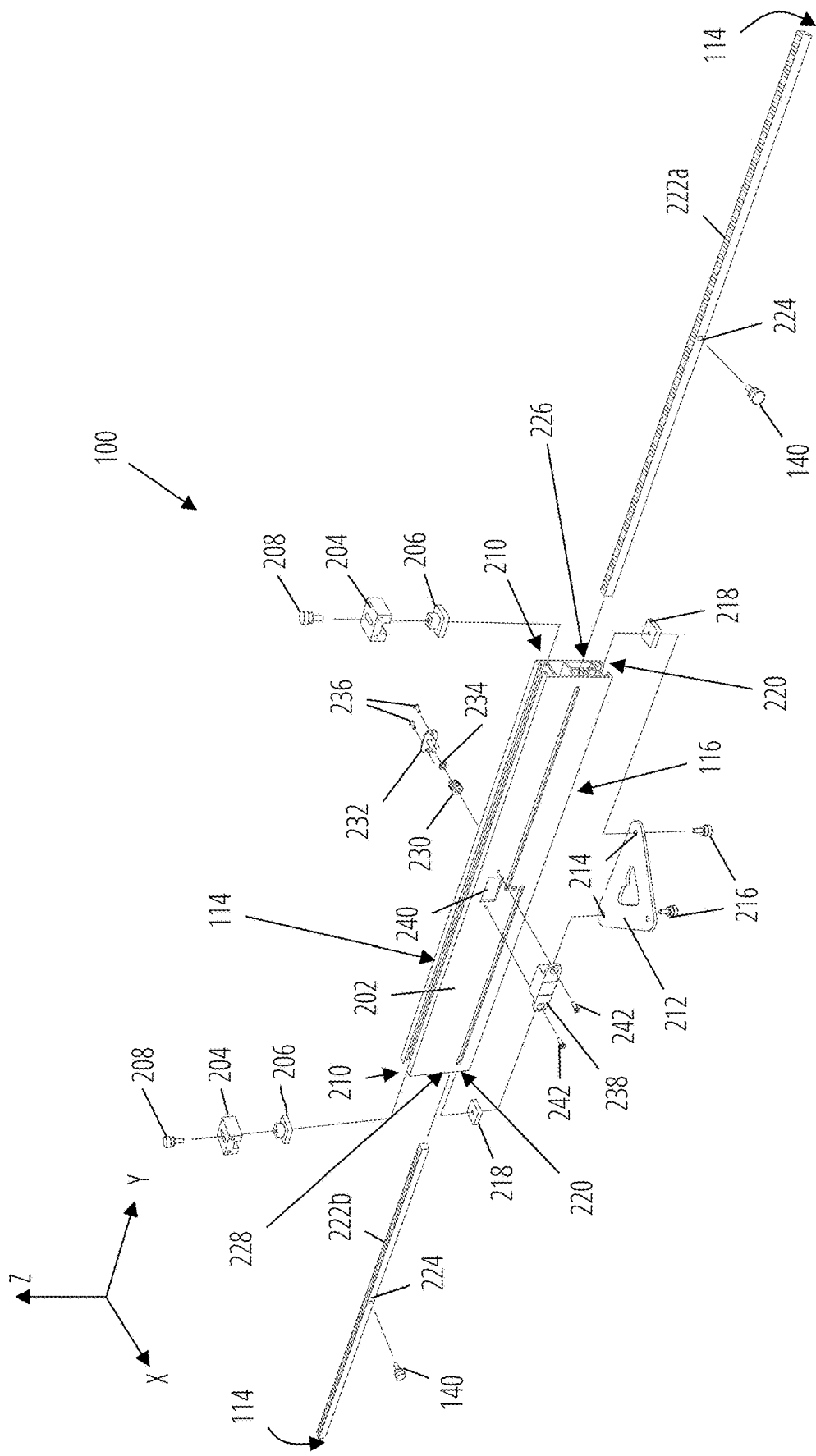
FIG. 2A an exploded view of the installation tool of FIGS. 1A-1H, in accordance with one embodiment.

FIG. 2A is an exploded view of the tool 100, in accordance with one embodiment. In this exemplary implementation, the body is an elongated rectangular extruded aluminum body 202. The skilled person in the art will appreciate that other embodiments may have the body 202 made from different strong and rigid materials, including other metals or plastics, as is well known in the art. In addition, different fabrication methods may also be considered, again without limitation.

The adjustable end-stops are shown comprising an end-stop body 204 affixed to an upper T-nut 206 via a thumbscrew 208. The upper T-nut 206 is configured and shaped so as to be slidingly engageable with the top channel 114 on either side via a top side aperture 210. The thumbscrew 208 can be fastened to reversibly secure the end-stop body 204 at a given location along the top channel 114.

The support mount is shown to comprise a mounting plate 212 comprising two holes 214 therein configured to receive therethrough two thumbscrews 216 which are fastened to the lower T-nuts 218. The lower T-nuts 218 are in turn configured to be slidingly engageable with the bottom channel 116 via the bottom aperture 220.

Furthermore, in this embodiment, the reversibly extendable arms are shown to take the form of a top gear rack 222a and a bottom gear rack 222b. Each gear rack 222a and 222b comprises a fastening hole 224 in the middle portion thereof to receive the item 140. Each gear rack 222a and 222b can be moved in and out of the body 204 via a corresponding top and bottom inner channels, discussed below, accessed via an upper rail receiving portion or aperture 226 and lower rail receiving portion or aperture 228, respectively. The gear mechanism that mechanically coupled the gear racks 222a and 222b, discussed further below, is shown to comprise a gear 230 which can be installed using an axel plate 232 (with a washer 234) which is fastened via a pair of screws 236. In some embodiments, the outer ends 114 of the gear racks 222a and 222b can comprise additional fastening holes therein (e.g., #8-32 holes or the like) to screw in extensions (not shown) if extra length is needed. Additionally, the bubble level 238 is shaped to be engageable with a window 240 on the front surface of the extruded body 202 and affixed via a pair of screws 242.

FIG. 2B shows a center cross-sectional view of the extruded body 202 only, while FIGS. 2C and 2D show the same cross-sectional view but with the tool partially or fully assembled. Due to the extruded nature of the body, the holes or channels shown herein typically extend from one end of the body to the other. In this example, we see that the top channel 114 and bottom channels 116 are each made of extruded T-shaped slots or rails. Also shown are the upper inner channel 226 and lower inner channels 228, which are configured to receive therein the upper gear rack 222a and lower gear rack 222b, respectively. In addition, channels 244 and 246 are used to receive therein the bubble level 238 and the axel plate 232, respectively.

FIG. 2C shows the same view as FIG. 2B, but with the end-stops (thumbscrew 208, end-stop body 204 and upper T-nut 206) inserted in the top channel 114, and the mounting plate 248 attached to the lower bottom channel 116 via the lower T-nut 218 and thumbscrew 216.

FIG. 2D is a similar cross-section view as FIG. 2C, but from the other side of the tool. It further shows how the end-stops can be easily assembled using the thumbscrew 208, end-stop body 204 and upper T-nut 206.

Figure 3:
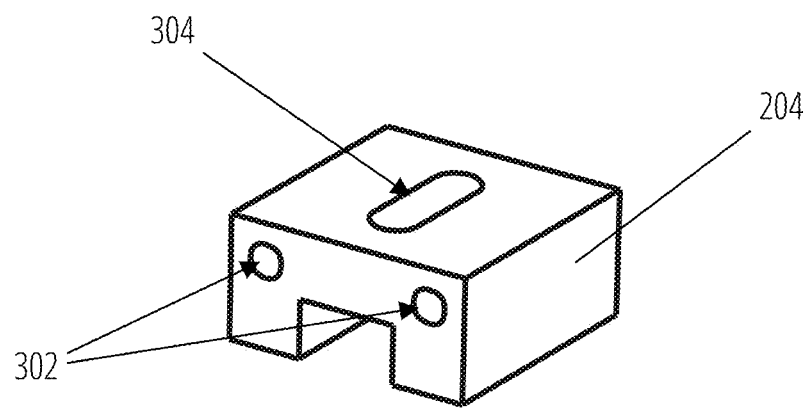
FIG. 3 is a perspective view of an end-stop body, in accordance with one embodiment.

FIG. 3 shows a close-up perspective view of the end-stop body 204. In this embodiment, it is substantially rectangular and comprises two fastening holes 302 therein which can be used to attach jigs or templates, as will be discussed further below. In addition, to accommodate for various jig or template thicknesses, the top hole 304 that receives the thumbscrew 208 is elongated in the front-to-back orientation (e.g., the x direction in FIG. 2A), while the bottom portion comprises a channel in the same orientation. This allows the user to move or slide the end-stop body 204 on the top portion of the upper T-nut 206 in the same front-to-back orientation and securing it using the thumbscrews 208.

Figure 4:
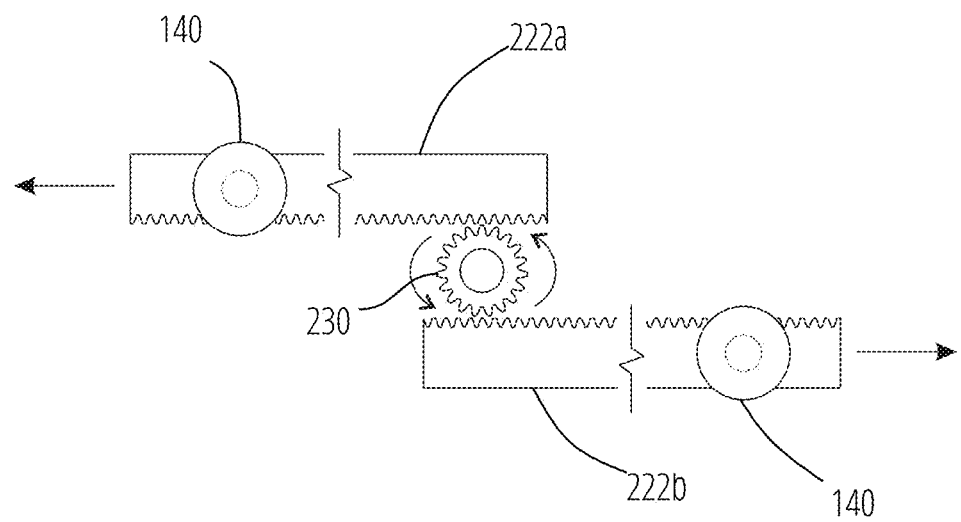
FIG. 4 is a schematic diagram illustrating an arm coupling mechanism, in accordance with one embodiment.

FIG. 4 shows a schematic diagram of the coupling mechanism which allows the arms 136 to be automatically moved together in opposite directions, in accordance with one embodiment. In this embodiment, when viewed from the back, once assembled, the upper gear rack 222a engage the gear 230 from the top, while the lower gear rack 222b engages the gear 230 from the bottom. Moving one gear rack in one direction automatically actuates the gear, which moves the other gear rack in the opposite direction by the same amount. The skilled person in the art will understand that other coupling mechanisms may also be used, without exception. These may include, for example, other mechanical or hydraulic coupling mechanism, but also electrical coupling mechanisms. In some embodiments, electrical motors or actuators may be used, powered for example via batteries or the like. In such examples, the extruded body 202 may further comprise additional apertures or holes therein to allow one or more buttons and/or input mechanisms to be integrated therein.

In some embodiments, the tool may have non-coupled (e.g., non-geared or other) extending arms. FIGS. 5A and 5B show a front view of an exemplary embodiment 500 of the tool where each extending arm 502 is manually independently extendable from the other. FIG. 5A shows the arms 502 fully extended while FIG. 5B shows the arms fully retracted. While such a configuration does not provide the self-centering feature described above, it does provide the advantage of allowing the arms to be extended further away (as seen in FIG. 5A). In addition, in this embodiment, the upper and lower tracks 504a and 504b provided on the front surface to move the thumbscrews 506 extend almost the whole length of the tool instead of just half the length as illustrated for the mechanically coupled embodiments. While not self-centering, a user can still center the tool manually using the front measuring scales 126. This allows both a centered or non-centered configuration to be used, as needed.

Figure 6A:
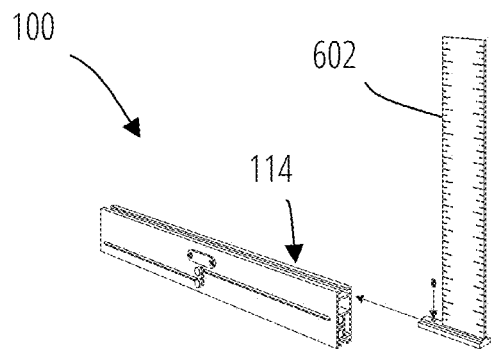
FIG. 6A and FIG. 6B are perspective views of the installation tool comprising a carpenter's square configured to slidingly engage the tool, in accordance with one embodiment.
Figure 6B:
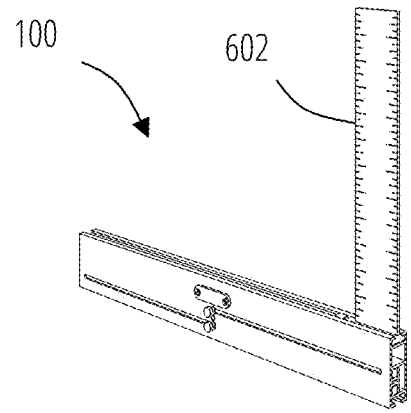

In some embodiments, the tool 100 may further comprise additional accessories, for example to acquire additional installation measurements. In one embodiment, as illustrated in FIGS. 6A and 6B, a carpenter's square 602 may be provided that is configured to slidingly engage the top channel 114. It can be slid and fastened with a set screw or other fastener.

Figure 7:
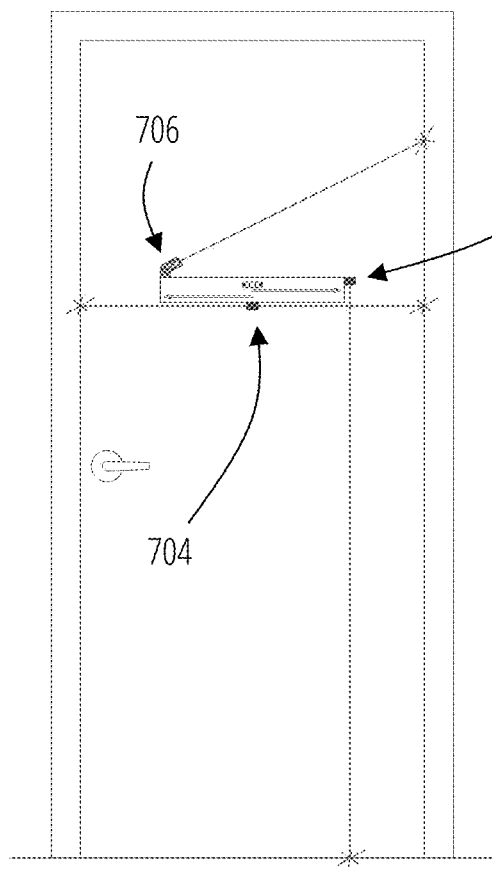
FIG. 7 is a front view of an installation tool comprising a plurality of laser distance and angle finders, in accordance with one embodiment.

In some embodiments, the accessories may comprise one or more laser distance finders or laser angle finders. An example is shown in FIG. 7 where two laser distance finders 702 and 704, and a laser angle finder 706, are shown being used to acquire or take the reference measurements. In this non-limiting example, the laser distance finder 702 is engaged with the top channel 114 and configured to extend over the edge of the tool and point the laser beam downwards to acquire the elevation. The laser distance finder 704 is engaged in the bottom channel 116 and configured to point two lasers beams in opposite directions to simultaneously acquire the left and right distances from the door frame, which can be used to center the tool horizontally. The laser angle finder 706 is shown engaged with the top channel 114 and configured to send a laser beam at a designated angle between the horizontal axis and a point along the door frame. The skilled person in the art will appreciate that other accessories, such as "T" bevel, clamps or others not explicitly discussed in the present disclosure can be similarly configured to slide into place and fastened in a similar fashion using either the top channel 114 or bottom channel 116.

Exemplary Use Cases:

The disclosure below will described a number of exemplary use cases showing how the tool may be used to install, for example various similarly-shaped signs, on a vertical surface at a plurality of installation locations.

FIGS. 8A to 8C are schematic diagrams illustrating two examples of a standard square-shaped sign 802 being installed on a door or near a door jamb using the tool 100. In all cases, the first step includes the user 804 extending and locking the height supporting member 122 at the desired elevation, as shown in FIG. 8A (e.g., 60 inches). Once the elevation has been determined, the tool 100 can be used in different ways, depending on where the sign 802 is to be affixed.

In a first case (FIG. 8B and FIGS. 9A to 9C), the sign 802 is to be centered on a door 806. To take the reference measurements and install the sign 802, the user first adjusts the adjustable end-stops 118 to the required sign width, for example using the back measurement scale 132 which is designed for such measurements, and locks them in position by fastening the thumbscrews 208. The user then abuts the rear surface of the tool 100 against the door 806, so as to have the front surface 104 of the tool facing him or her. The user extends the self-centering arms 136 using the thumbscrews 140 until their ends reach the interior surface of the door frame 808 on both sides. Once the arms 136 are properly extended, the user then locks them in position by fastening the thumbscrews 140. Finally, the sign 802 (with adhesive on the back) can rest its bottom edge on the tool between the adjustable end-stops 118 and be tilted into place against the door (as illustrated in FIG. 9B).

In a second case (FIG. 8C), the sign 802 is to be affixed on a wall 810 next to a door. To take the reference measurements and install the sign, the user abuts the rear surface of the tool against wall, and abuts the end portion 112 against the outer edge of the door jamb 812. The closest adjustable end-stop 118 is moved until its inside edge 130 is at the desired horizontal offset distance (e.g., 4.00") using the front measuring scales 126 and locked at that position. The tool is then leveled using the bubble level 238. As mentioned above, the sign 802 can rest its bottom edge on the tool and against the inside edge 130 of the end-stop and tilted into place against the door.

In both examples given above, once a first sign has been installed, the tool can be moved to a plurality of similar installation sites. Since the height supporting member 122 and the adjustable end-stops 118 are already locked in position at the reference installation measurements, the user only has to place the sign on the tool (either in-between the end-stops 118 or against the inside edge of one, depending on the case) and secure it to the door or wall, without the need to re-measure anything a second time. Thus, the subsequent installations can be easier, faster and error-free.

Figure 10A:
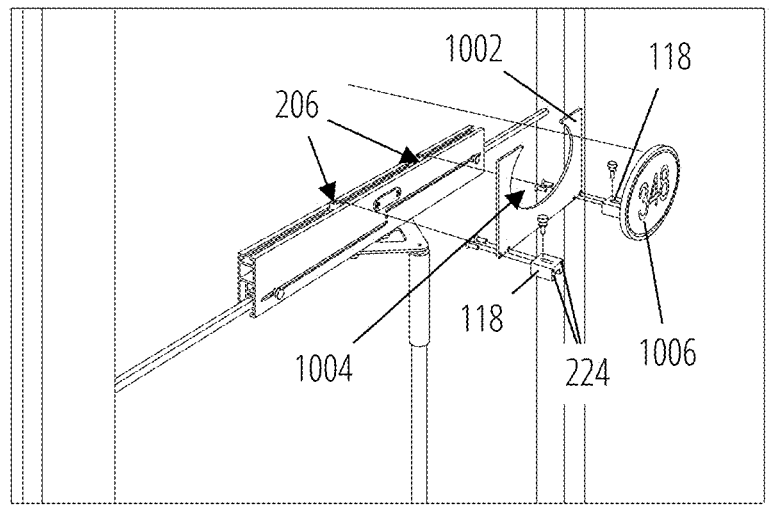
FIGS. 10A to 10E are schematic diagrams illustrating an exemplary use-case where a user installs a non-regularly shaped sign using a jig and the installation tool of FIGS. 1A to 1F, in accordance with one embodiment.

In some embodiments, the tool 100 may comprise accessories such as templates or jigs. FIGS. 10A to 10E shows one such example, in accordance with one embodiment. FIG. 10A shows a jig 1002 configured to be fastened to the adjustable end-stops 118 via the fastening holes 224 with fasteners. The jig 1002 is rectangularly-shaped and comprises therein a custom-made hole 1004 specifically shaped to receive the sign 1006 to be installed. In this example the sign 1006 has an oval shape as an example only. The skilled person in the art will appreciate that virtually any shaped hole can be made in the jig, as required. In some embodiments, the custom jig 1002 can be made with materials such as acrylic or the like, although different materials can be used as well.

As discussed above, the installations steps include extending and locking the height supporting member 122 at the correct elevation, leveling the tool and extending the self-centering arms 136 to center the tool on the door.

Figure 10B:
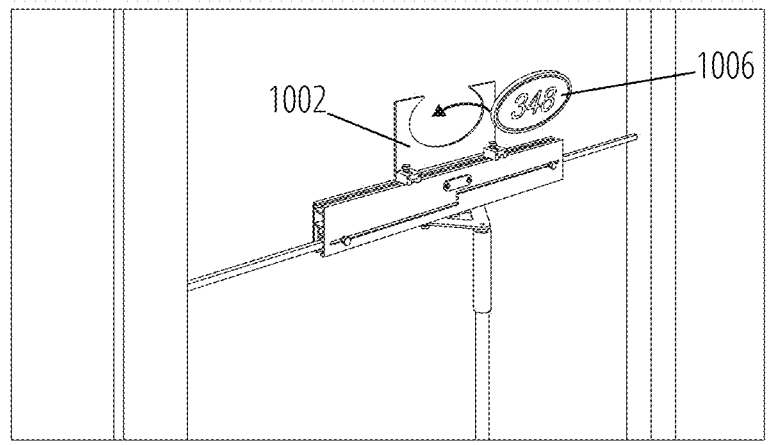
Figure 10C:
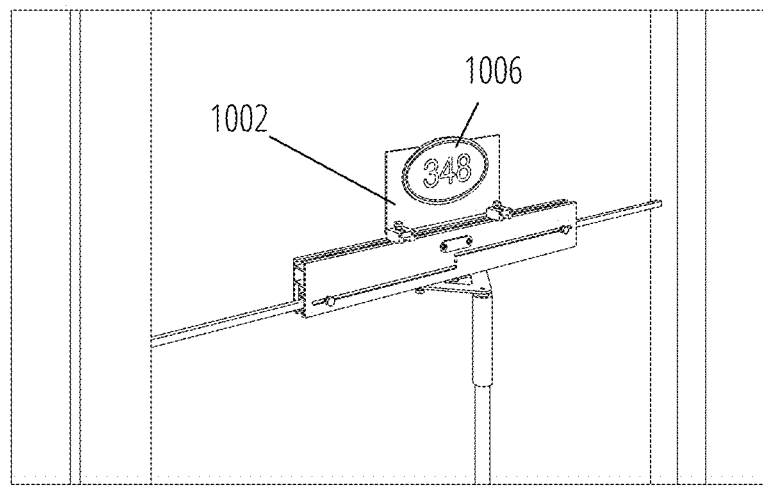
Figure 10E:
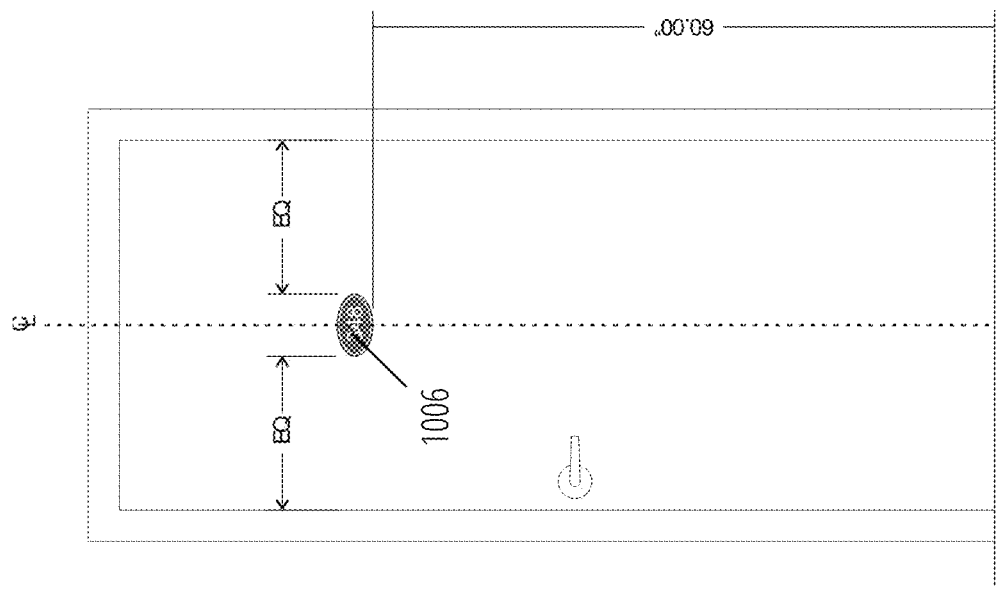
Figure 10D:
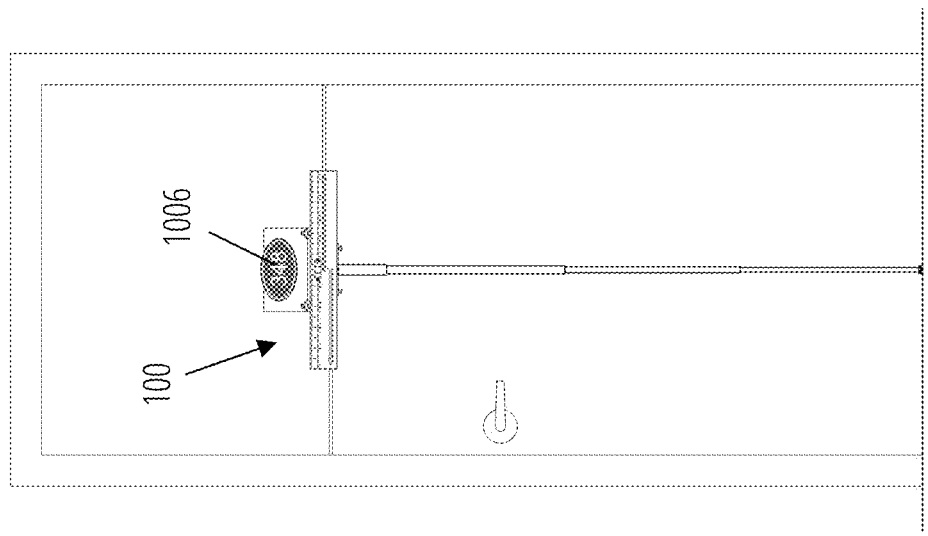

As shown in FIG. 10B, once the end-stops 118 with the jig 1002 are centered, the sign 1006 can be placed on the custom-made hole 1004. This is done by gently resting the bottom edge of the sign on the jig and tilting it until it rests flat against the door, as shown in FIG. 10C. FIGS. 10D and 10E show the final result, before (10D) and after (10E) the tool has been removed. FIG. 10E clearly shows how the sign 1006 has been accurately centered on the door.

Figure 11A:
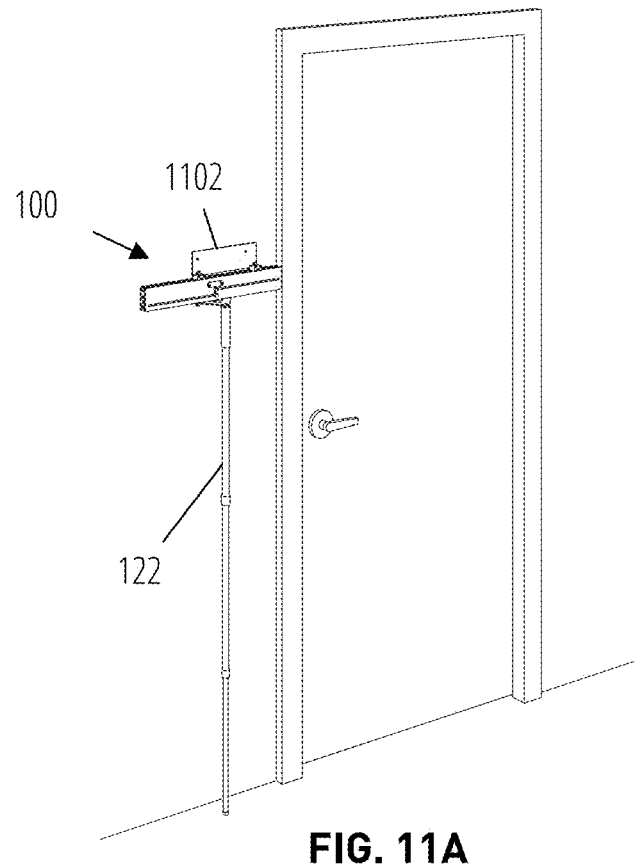
FIGS. 11A to 11F are schematic diagrams illustrating an exemplary use-case where a user installs a sign that requires point support mounting using a jig and the installation tool of FIGS. 1A to 1F, in accordance with one embodiment.
Figure 11B:
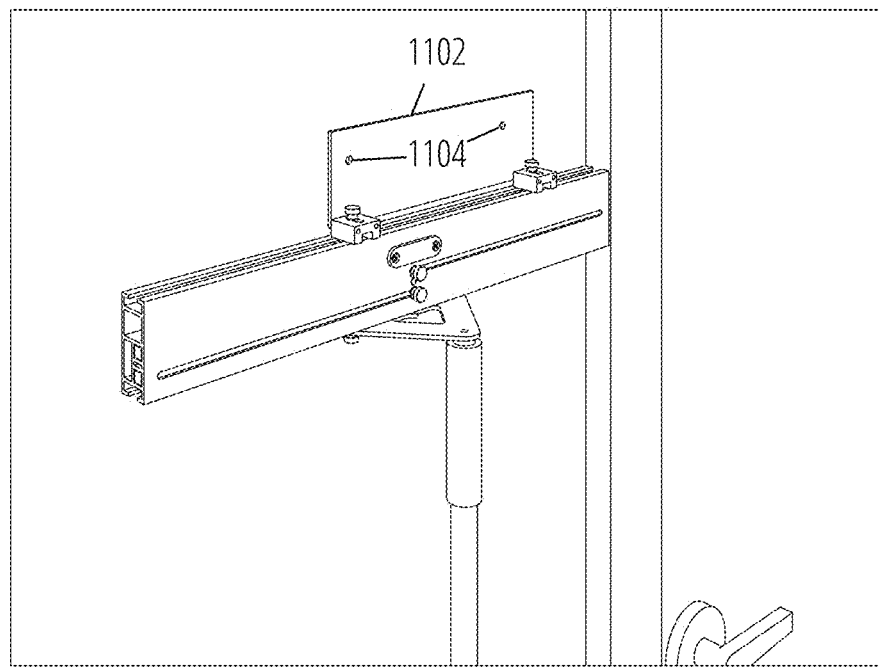

FIGS. 11A to 11F show another use-case example where the tool 100 is used to install signs that require point support mounting next to a door. In this example, another jig 1102 has been custom designed to be fastened to the two adjustable end-stops 118, as described above. As shown in FIG. 11B, in this example, the jig 1102 has two holes or apertures 1104 in it that indicate where corresponding mounting holes 1106 are to be drilled in the wall for anchors. The tool 100 is used to place or align the jig 1102 at the proper horizontal offset distance from the door jamb 1108 (here a 4" from door frame mounting standard).

Figure 11C:
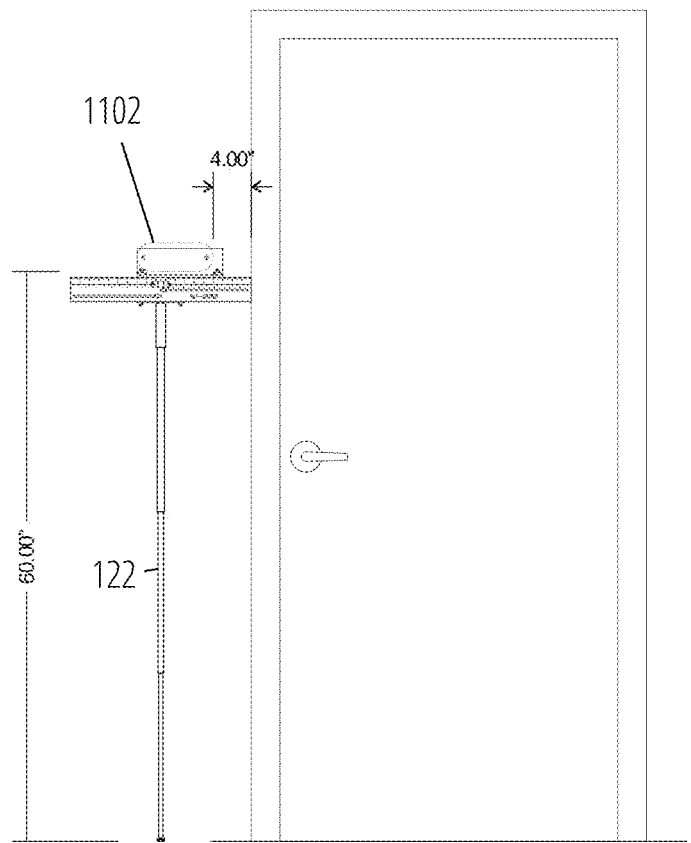
Figure 11D:
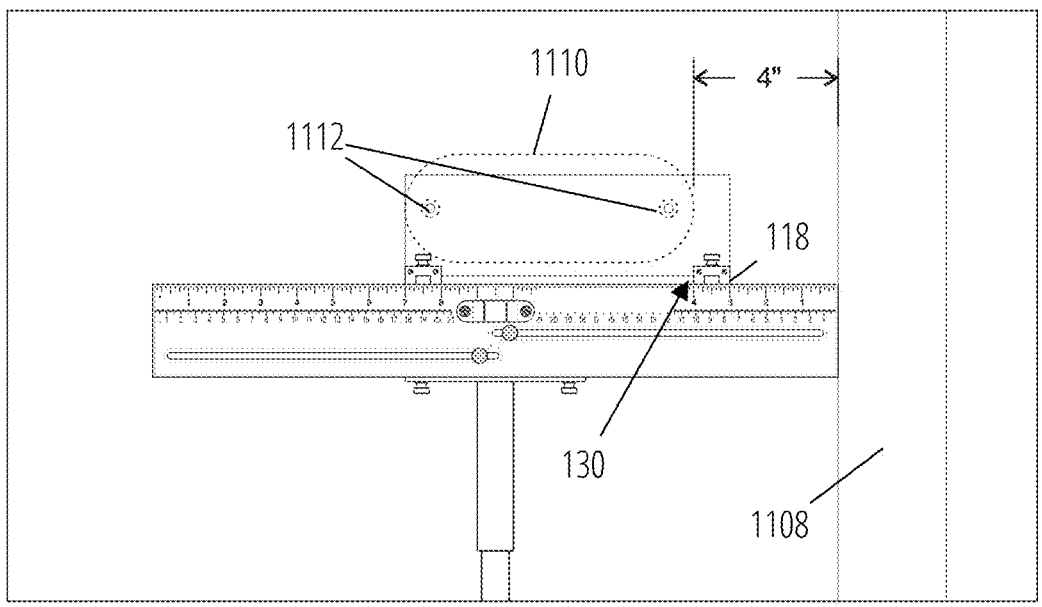

This is shown in FIG. 11C and FIG. 11D, where an outline 1110 of the desired sign location is shown superimposed on the jig 1102. In this example, the holes 1112 in the jig 1102 are made just so that the edge of the sign will be exactly 4" from the door jamb upon having the inner edge 130 of the adjustable end-stop 118 at the 4" mark, using the front measuring scales 126. The user can then mark the locations of the holes 1112 using a pencil or pen, and remove the tool to drill the mounting holes, or the mounting holes can be drilled directly using the jig 1102.

Figure 11E:
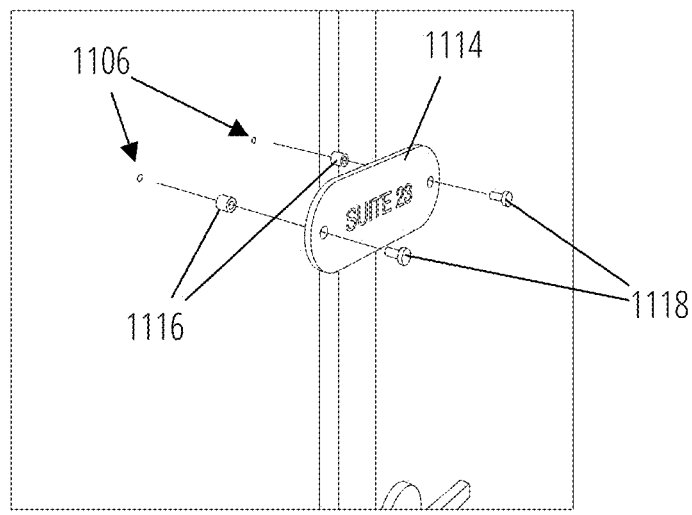

As shown in FIG. 11E, after the mounting holes 1106 are drilled in the wall, the tool 100 is removed and the sign 1114 can be mounted or installed using standard fastening means, for example anchors 1116 and screws 1118.

Figure 11F:
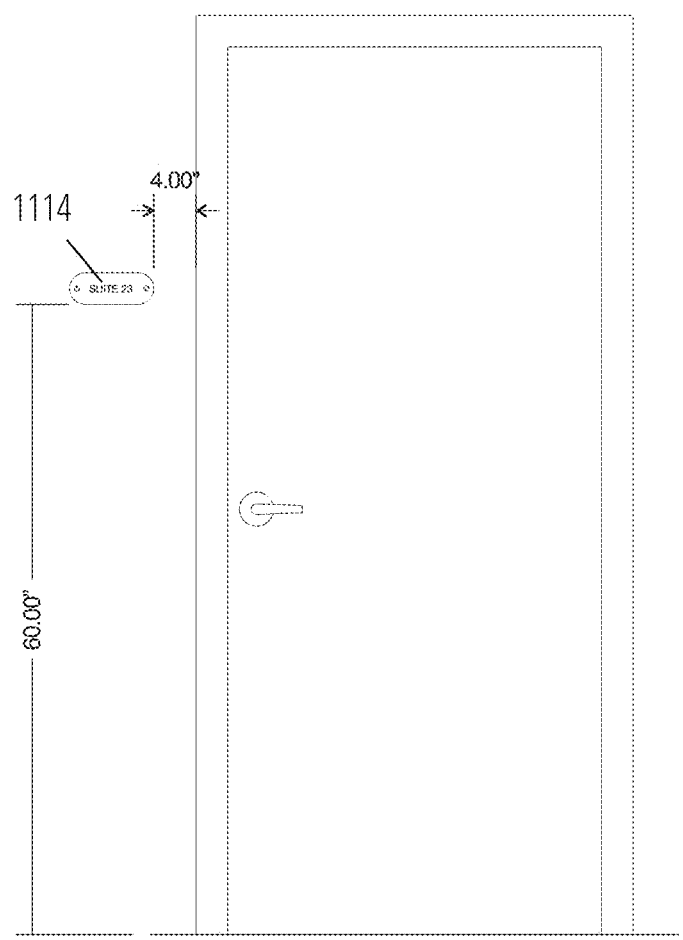

FIG. 11F show the sign 1114 installed next to the door at the reference measurements (e.g., elevation of 60" and 4" horizontal offset). As described above, the tool 100 can be easily reused with the locked reference measurements and the jig 1102 to rapidly and consistently install similar signs at additional installation locations. The skilled person in the art will appreciate that the jig 1102 is an example only and that a different number and placement of holes may be used, without limitation, as required by the sign to the installed.

In some embodiments, cut-out jigs or templates (not shown) made for painting text and/or images may equally be used as well.

In some embodiments, blank jig or template material can be provided or sold to the user, either with the tool 100 or sold separately, so that the user can custom-create the appropriate design or holes therein, as required. In other embodiments, pre-cut jigs or templates can be provided or sold.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A tool for acquiring a plurality of reference installation measurements and for consistently affixing a plurality of similarly-shaped objects on a vertical surface at a corresponding plurality of installation sites in accordance with said reference installation measurements, the tool comprising:
   a rigid and elongated rectangular body, said body extending longitudinally according to a first axis, the body comprising:
   a top flat surface and a bottom flat surface, the top flat surface and bottom flat surface parallel to each other and each comprising integrated therein a top channel and a bottom channel, respectively, the top and bottom channels extending along the first axis;
   a front flat surface and a rear flat surface, the front flat surface and the rear flat surface parallel to each other and each perpendicular to the top flat and bottom flat surfaces; each of the front flat surface and the rear flat surface comprising thereon corresponding measurement scale for acquiring, at least in part, said plurality of reference installation measurements;
   and two end flat surfaces, each end flat surface perpendicular to the top flat surface, bottom flat surface, front flat surface and rear flat surface, and each comprising therein a top aperture for accessing the top channel and a bottom aperture for accessing the bottom channel;
   a bubble level in said front flat surface; and
   two elongated arms, each arm being reversibly extendable from one of the two end flat surfaces along the first axis;
   two end-stops, each end-stop configured to be slidingly movable along the top channel and comprising a securing means thereon to releasably secure the end-stop at a position along said top channel; and
   a support mount slidingly movable along the bottom channel and configured to have fastened thereto an extendable vertical support member, the support member configured to support the tool at a reference elevation, the reference elevation being part of the plurality of reference installation measurements.

2. The tool of claim 1, wherein the plurality of objects is selected from the group consisting of: signs, boards, panels, frames, hooks, mounts, brackets, fire extinguisher enclosures, hand sanitation stations, soap dispensers, artwork, whiteboards, bulletin boards, and security cameras.

3. The tool of claim 1, wherein the vertical surface includes a wall, a window or a door.

4. The tool of claim 1, wherein each of the two end-stops is further slidingly movable horizontally along an orientation perpendicular to said first axis.

5. The tool of claim 1, further comprising:
   one or more accessories, each accessory configured to be removably slidingly engageable with the top channel via the top aperture or the bottom channel via the bottom aperture and operable to be slidingly moved along either top or bottom channel and secured at a location thereon.

6. The tool of claim 5, wherein said one or more accessories comprise a carpenter's square.

7. The tool of claim 5, wherein said one or more accessories comprises at least one laser distance finder or at least one laser angle finder.

8. The tool of claim 1, further comprising:
   a jig; and
   wherein each of the end-stops comprises one or more fastening holes for therein for fastening said jig thereto.

9. The tool of claim 8, wherein the jig comprises one or more holes therein for drilling one or more corresponding mounting holes.

10. The tool of claim 8, wherein the jig comprises a cut-out shaped to receive each of the plurality of signs.

11. The tool of claim 1, wherein said support member is a telescopic monopod.

12. The tool of claim 1, wherein the measurement scale of the front flat surface is configured to measure a distance relative the closest of the end surfaces.

13. The tool of claim 1, wherein the measuring scale of the rear flat surface is configured to measure a distance from a center position of the elongated body along the first axis.

14. The tool of claim 1, wherein at least one of the two elongated arms comprises a securing means operable to be used to manually extend or retract the arm and configured to releasably securing at a designated extension length.

15. The tool of claim 14, wherein the two elongated arms are coupled to one another, so that extending one arm via the securing means in one direction automatically extends the other arm in the opposite direction by a same amount.

16. The tool of claim 15, wherein each of the two elongated arms comprise a gear rack, and wherein the two gear racks are mechanically coupled via a gear engaging each gear rack from opposite sides thereof.

17. A process for acquiring a set of installation measurements, for, using the tool of claim 1, the installation measurements comprising a designated elevation, designated horizontal position and designated end-stop positions, and for affixing a plurality of similarly-shaped objects on a vertical surface at a corresponding plurality of installation sites in accordance with said reference installation measurements, each object of said plurality of objects having an mounting surface thereof coated with adhesive, the method comprising the steps of:
   moving the tool to a first installation site of said plurality of installations sites;
   adjusting at least one of the two end-stops at said designated end-stop positions;
   locking each of the two end-stops at the designated end-stop positions;
   extending said support member at said designated elevation;
   locking the support member at the designated elevation;
   abutting the rear flat surface against the vertical surface;
   positionally adjusting the tool horizontally at said designated horizontal position;
   leveling the tool horizontally using the bubble level;
   abutting a bottom edge of a first object of said plurality of objects on said top flat surface in-between the inner edges of each end-stop, the mounting surface facing the vertical surface;
   pivoting the first object towards a vertical surface, so as to secure the first object to the vertical surface via the adhesive on the mounting surface.

18. The process of claim 17, further comprising the steps of:
   moving the tool to a second installation side of said plurality of installation sites;
   abutting the rear flat surface of the tool against the vertical surface at said second installation site;
   positionally adjusting the tool horizontally based on said designated horizontal position;
   abutting a bottom edge of a second object of said plurality of objects on said top flat surface in-between the inner edges of each end-stop;
   pivoting the second object towards the vertical surface, so as to secure the second object to the vertical surface via the adhesive on the mounting surface.

19. The process of claim 17, wherein said vertical surface is a door, and
   wherein said adjusting the end-stops positions include the steps of:
   moving the two end-stops equidistantly left and right of a center location of the tool along said first axis to the designated end-stop positions so that the distance between the inner edges of each end-stop is equal to a width of each of said plurality of objects;
   locking the end-stops; and
   wherein said positionally adjusting the tool horizontally includes the steps of:
   placing the tool within a door frame;
   equally extending the extendable arms in opposite directions so that they reach the inner surfaces of a door frame on both sides of the tool, thereby centering the tool with respect to the door frame; and
   locking the extendable arms.

20. The process of claim 17, wherein said vertical surface is a wall near a door frame, and
   wherein said adjusting the end-stops positions include the steps of:
   moving an end-stop of said two end-stops to a designated end-stop position corresponding to an offset distance between an inner edge of the end-stop and a closest of the two end flat surfaces;
   locking the end-stops; and
   wherein said positionally adjusting the tool horizontally includes the steps of:
   abutting said closest of the two end surfaces against an outer edge of the door frame.

* * * * *